US010660125B2

(12) United States Patent
Irie et al.

(10) Patent No.: US 10,660,125 B2
(45) Date of Patent: May 19, 2020

(54) BASE STATION APPARATUS, WIRELESS TERMINAL APPARATUS, AND WIRELESS COMMUNICATION METHOD

(71) Applicant: Panasonic Intellectual Property Management Co., Ltd., Osaka (JP)

(72) Inventors: Masataka Irie, Kanagawa (JP); Michael Hong Cheng Sim, Singapore (SG); Yao Huang Gaius Wee, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 50 days.

(21) Appl. No.: 15/970,274

(22) Filed: May 3, 2018

(65) Prior Publication Data

US 2018/0255571 A1 Sep. 6, 2018

Related U.S. Application Data

(63) Continuation of application No. PCT/JP2016/004489, filed on Oct. 5, 2016.

(30) Foreign Application Priority Data

Nov. 5, 2015 (JP) .................... 2015-217989

(51) Int. Cl.
*H04W 74/00* (2009.01)
*H04W 72/00* (2009.01)
(Continued)

(52) U.S. Cl.
CPC ......... *H04W 74/006* (2013.01); *H04L 5/0091* (2013.01); *H04W 48/12* (2013.01);
(Continued)

(58) Field of Classification Search
CPC .............. H04W 74/006; H04W 48/12; H04W 74/0808; H04W 72/042; H04W 74/0816;
(Continued)

(56) References Cited

U.S. PATENT DOCUMENTS

2002/0071449 A1 6/2002 Ho et al.
2004/0264475 A1* 12/2004 Kowalski ................ H04L 47/24
370/395.5
(Continued)

FOREIGN PATENT DOCUMENTS

JP 2002-314551 A 10/2002
JP 2009-522930 A 6/2009
(Continued)

OTHER PUBLICATIONS

International Search Report of PCT application No. PCT/JP2016/004489 dated Jan. 10, 2017.
(Continued)

*Primary Examiner* — Kiet Tang
(74) *Attorney, Agent, or Firm* — Seed IP Law Group LLP

(57) ABSTRACT

A base station apparatus that performs a wireless communication with a plurality of wireless terminal apparatuses according to IEEE802.11, including a frame generator that generates one or more first frames, each first frame including information indicating that a TXOP period assigned for communication with one of the plurality of wireless terminal apparatuses has expired and an additionally added Beacon element including information associated with the base station apparatus, and a transmitter that transmits the generated one or more first frames to the plurality of wireless terminal apparatuses.

19 Claims, 30 Drawing Sheets

(51) Int. Cl.

| | | |
|---|---|---|
| *H04L 12/851* | (2013.01) | |
| *H04W 48/16* | (2009.01) | |
| *H04W 74/08* | (2009.01) | |
| *H04W 48/12* | (2009.01) | |
| *H04L 5/00* | (2006.01) | |
| *H04W 72/04* | (2009.01) | |
| *H04W 72/12* | (2009.01) | |
| *H04W 84/12* | (2009.01) | |

(52) U.S. Cl.
CPC ....... *H04W 72/042* (2013.01); *H04W 72/121* (2013.01); *H04W 74/0808* (2013.01); *H04W 74/0816* (2013.01); *H04L 5/0048* (2013.01); *H04W 72/046* (2013.01); *H04W 84/12* (2013.01)

(58) Field of Classification Search
CPC . H04W 72/121; H04W 16/28; H04W 72/046; H04W 84/12
See application file for complete search history.

(56) References Cited

U.S. PATENT DOCUMENTS

| | | |
|---|---|---|
| 2008/0267142 A1 | 10/2008 | Mushkin et al. |
| 2015/0181620 A1 | 6/2015 | Seok |
| 2015/0245283 A1* | 8/2015 | Park ...................... H04W 48/16 455/434 |
| 2016/0037484 A1* | 2/2016 | Kwon ................. H04W 72/005 370/312 |

FOREIGN PATENT DOCUMENTS

| | | |
|---|---|---|
| JP | 2015-512223 A | 4/2015 |
| JP | 2015-523802 A | 8/2015 |
| JP | 2016-213760 A | 12/2016 |
| WO | 2007/081683 A2 | 7/2007 |
| WO | 2013/130998 A1 | 9/2013 |

OTHER PUBLICATIONS

IEEE Std 802.11TM-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

IEEE Std 802.11adTM-2012, IEEE Standard for Information Technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

* cited by examiner

FIG. 3B

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag- ments | Re- try | Power Manage- ment | More Data | Protect- ed Frame | Order |

Bits: 2 2 4 1 1 1 1 1 1 1 1

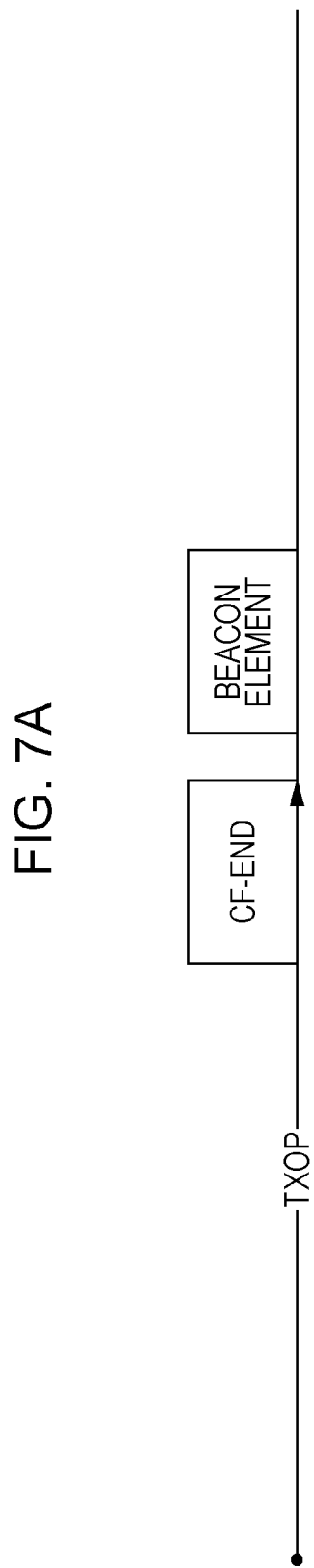

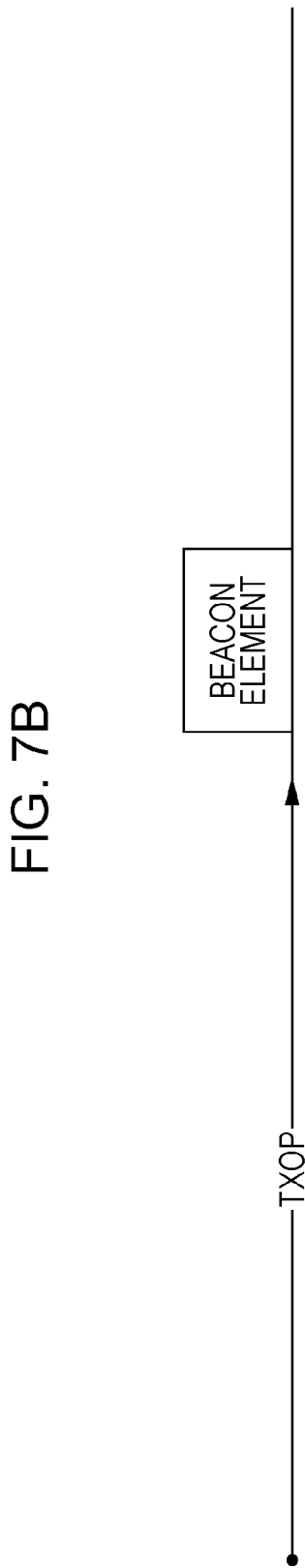

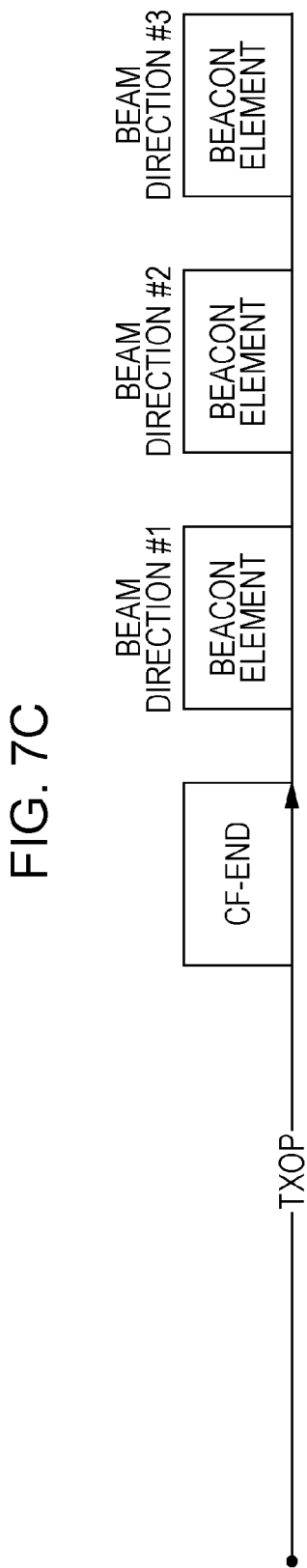

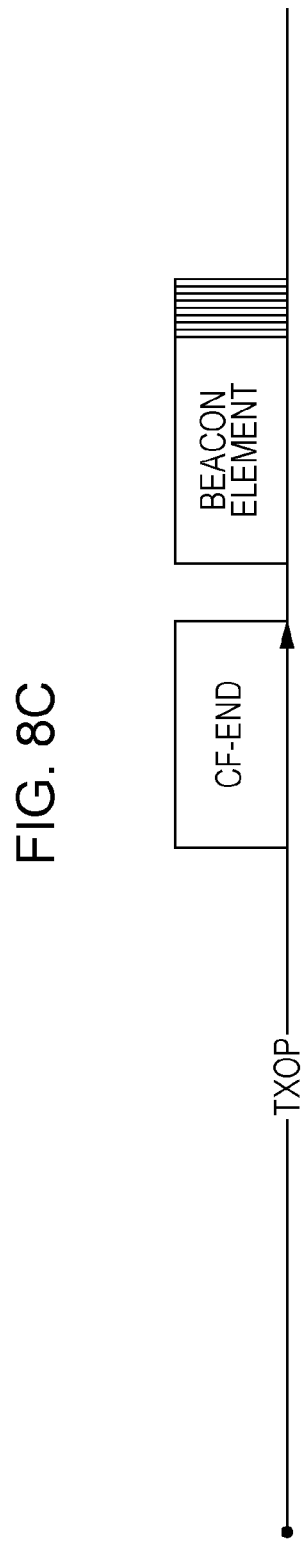

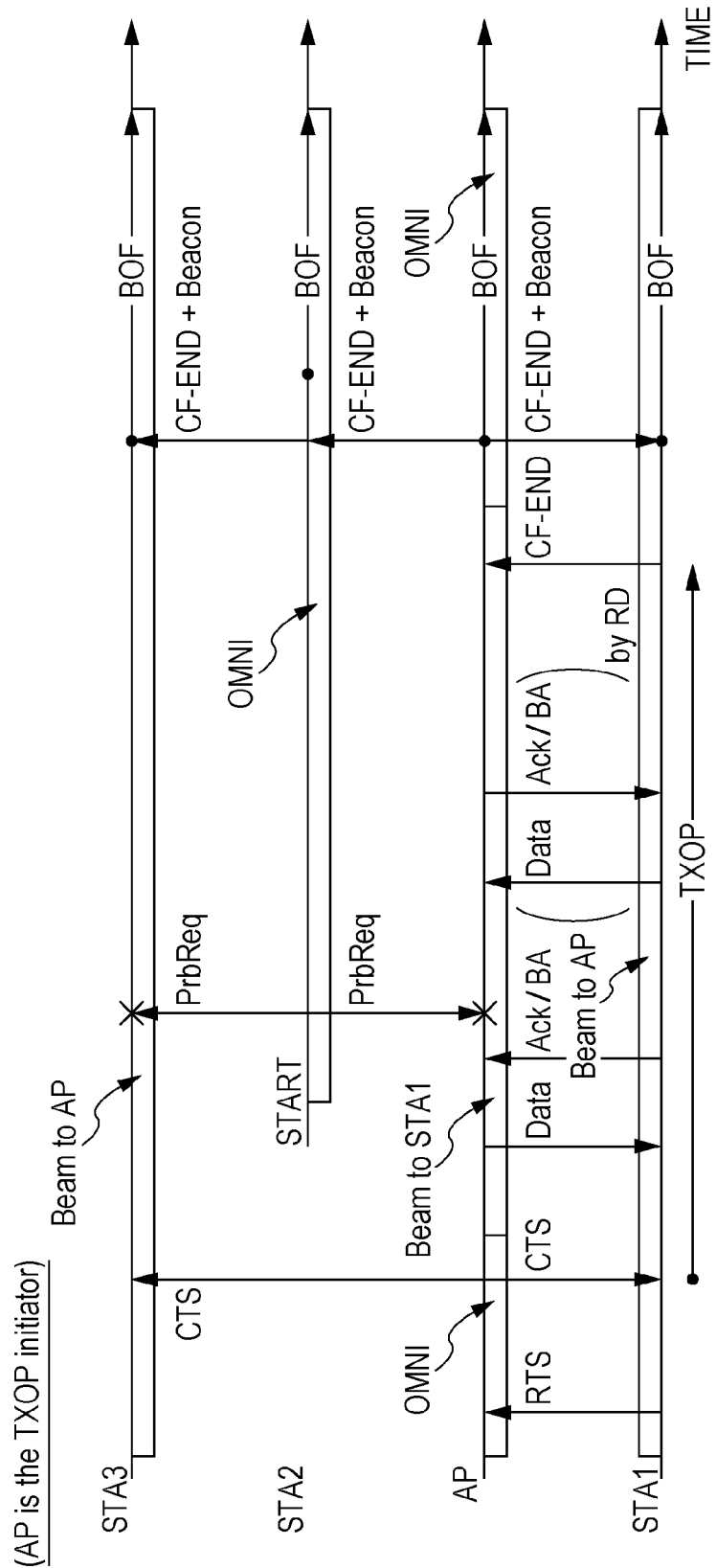

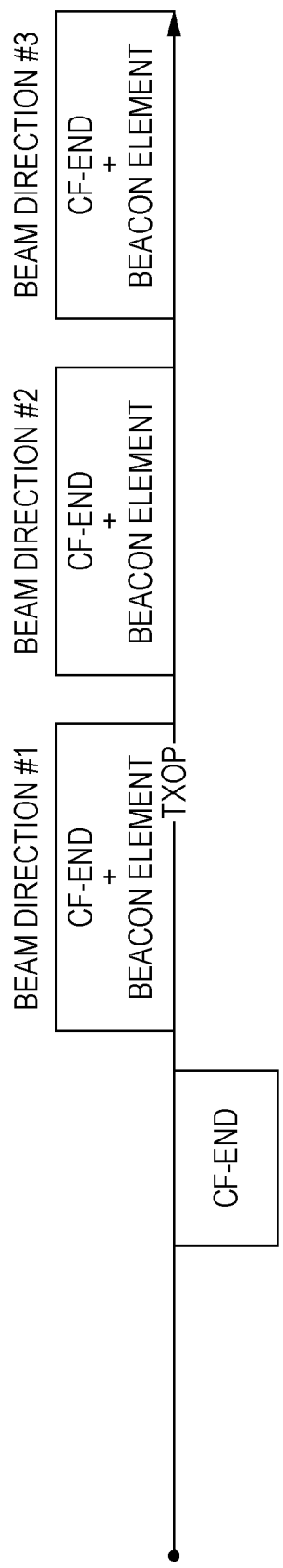

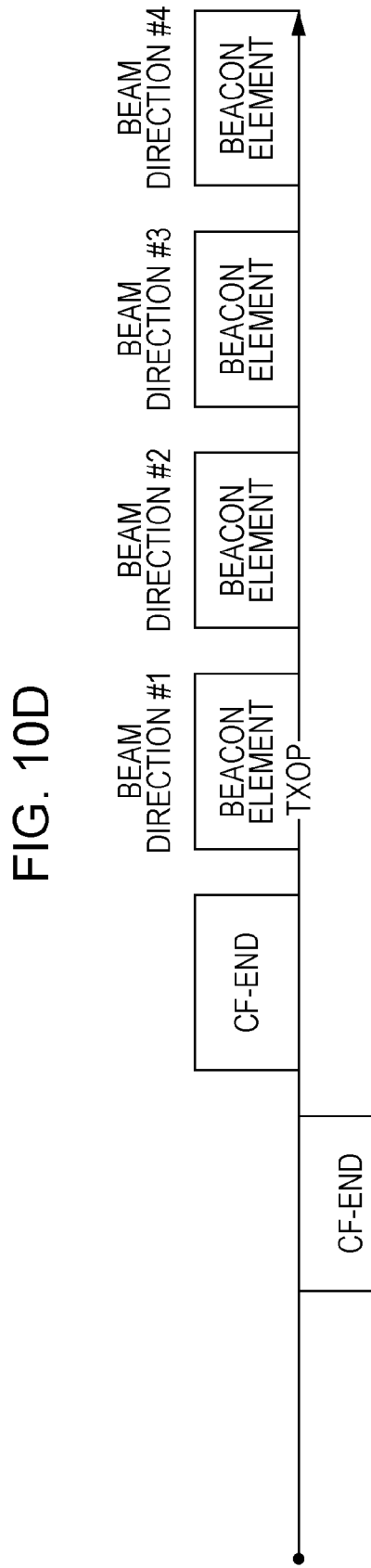

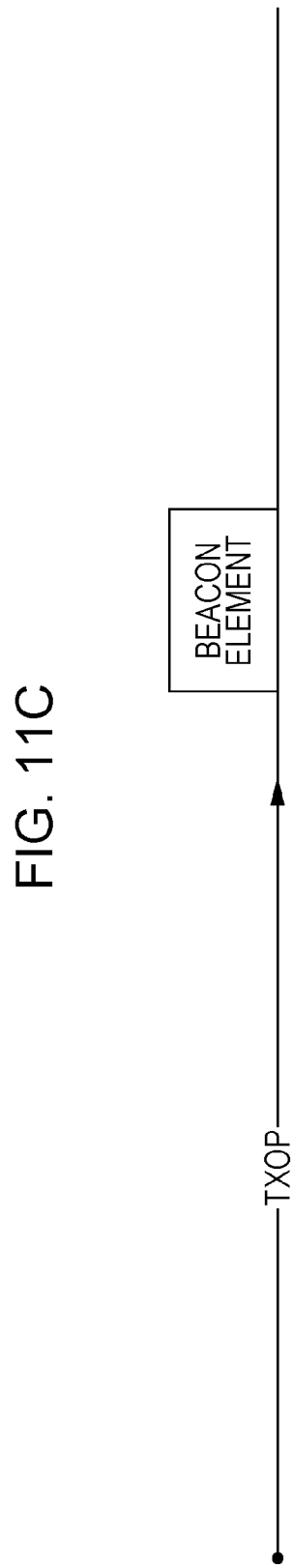

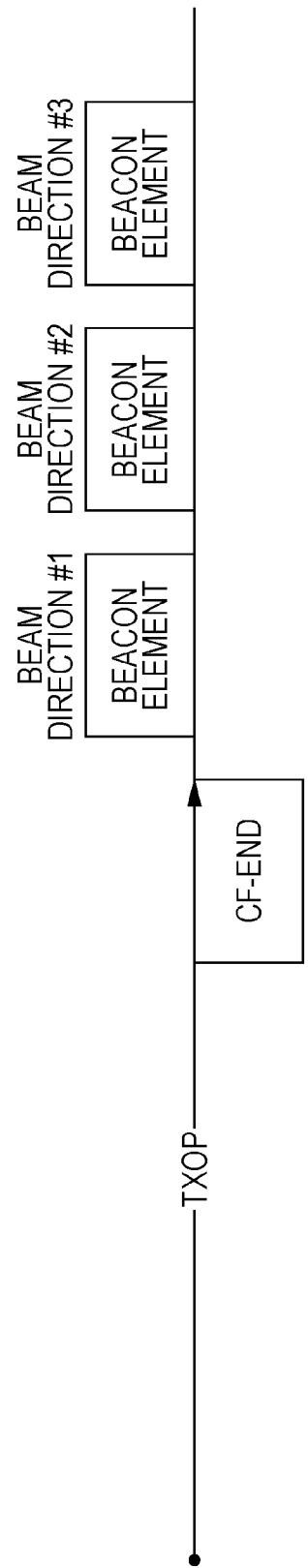

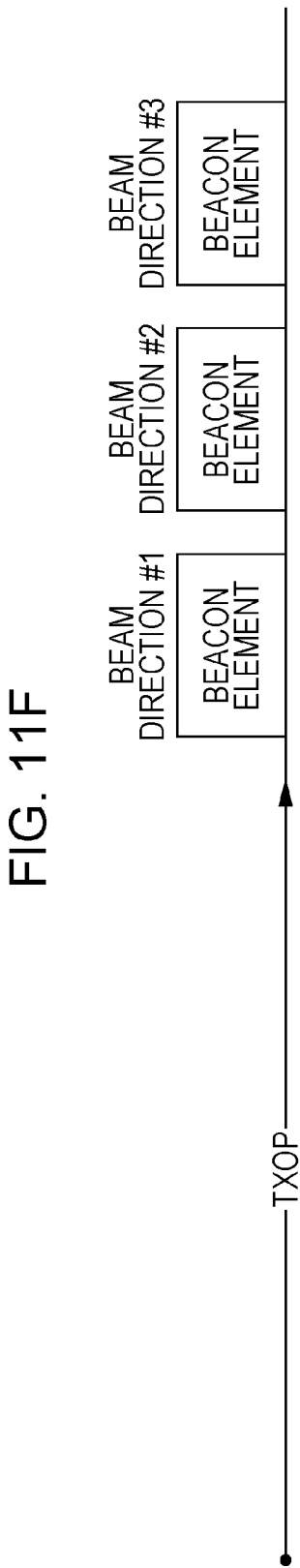

BASE STATION APPARATUS, WIRELESS TERMINAL APPARATUS, AND WIRELESS COMMUNICATION METHOD

BACKGROUND

1. Technical Field

The present disclosure relates to a base station apparatus, a wireless terminal apparatus, and a wireless communication method, for performing wireless communication according to IEEE802.11.

2. Description of the Related Art

Wireless LAN (Local Area Network) systems according to IEEE (The Institute of Electrical and Electronics Engineers, Inc.) 802.11 are widely used as systems that realize high-speed wireless data communication. The wireless LAN systems according to IEEE802.11 can be roughly classified into two types depending on radio frequencies.

One type is called non-DMG and is assumed to be used in a microwave band below 6 GHz. This type includes IEEE802.11a, b, g, n, ac systems. The other type is called DMG and is assumed to be used in a millimeter-wave band. This type includes an IEEE802.11ad system and the like. Note that DMG stands for Directional Multi Gigabit.

A DMG device used in the millimeter-wave band is capable of suppressing a reduction in an effective band width caused by interference by using a beamforming technique, spatial multiplication, or similar techniques that are enabled by the property of line-of-sight propagation of radio waves used, and it is predicted to provide a wireless network that allows a transmission rate higher than 1 Gbps in an effective throughput.

Descriptions of related techniques may be found, for example, in IEEE802.11-2012 and IEEE802.11ad-2012.

SUMMARY

A wireless LAN communication procedure generally includes scanning, connection authentication, data communication, and disconnection, which are performed in this order. An increase in the data communication rate causes an increase in the ratio of time needed to perform scanning and connection authentication to the total time needed for communication. More specifically, for example, in a case where data of 700 MBytes is transmitted in a wireless communication LAN system with an effective throughput of 2 Gbps, a time needed for the transmission is 700 (MBytes)*8 (bits/Byte)/2 (Gbps)=2.8 (seconds). In this case, for example, if scanning for data communication needs 500 milliseconds and connection authentication needs 50 milliseconds, the total time needed for data communication is 3.35 seconds, and thus the time needed for the scan and the connection authentication occupies about ⅙ of the total data communication time. Furthermore, in a case where when the data communication rate is increased, for example, by a factor of 2, that is, when the data communication rate is increased to 4 Gbps, if the time needed for the scan and the connection authentication remains the same, then the time needed for the scan and the connection authentication occupies about ⅓ of the total data communication time. Thus, there is a need for a reduction in time needed for scanning and connection authentication.

The scan is an operation of searching for a connection device (for example, a base station apparatus such as an access point or the like) with which a wireless terminal apparatus is to communicate. The time needed for the san depends on a transmission repetition period of a Beacon frame which is one type of management frame periodically transmitted by a base station apparatus. The transmission repetition period of the Beacon frame is 100 milliseconds. The transmission repetition period of the Beacon frame may be set to be smaller than 100 milliseconds. However, if the frequency of transmitting the Beacon frame that does not carry data is increased, the result is a reduction in an effective bandwidth, that is, a reduction in an effective throughput. In DMG, the transmission beam has strong directivity, and thus the increase in the frequency of transmitting the Beacon frame may cause interference to occur between wireless communication apparatuses (wireless terminal apparatuses, base station apparatuses), which may impair the effective bandwidth.

One non-limiting and exemplary embodiment provides a base station apparatus, a wireless terminal apparatus, and a wireless communication method, capable of suppressing a reduction in an effective bandwidth due to a transmission of a Beacon frame or interference between wireless communication apparatuses thereby making it possible to perform scanning in a short time.

In one general aspect, the techniques disclosed here feature a base station apparatus that performs a wireless communication with a plurality of wireless terminal apparatuses according to IEEE802.11, including a frame generator that generates one or more first frames, each first frame including information indicating that a TXOP period assigned for communication with one of the plurality of wireless terminal apparatuses has expired and an additionally added Beacon element including information associated with the base station apparatus, and a transmitter that transmits the generated one or more first frames to the plurality of wireless terminal apparatuses.

According to the aspect, it is possible to suppress a reduction in an effective bandwidth due to a transmission of a Beacon frame or interference between wireless communication apparatuses and it is possible to perform scanning in a short time.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3B is a diagram for illustrating a structure of a Frame Control field in a MAC header illustrated in FIG. 3A;

FIG. 7A is a sequence diagram illustrating an example of a sequence in which a CF-END frame is transmitted at an end of a TXOP period assigned to an AP and a frame including a Beacon element is transmitted after the TXOP period expires; FIG. 7B is a sequence diagram illustrating an example of a sequence in which a frame including a Beacon element is transmitted after a TXOP period assigned to an AP expires;

FIG. 7C is a sequence diagram illustrating an example of a sequence in which after a CF-END frame is transmitted at an end of a TXOP period assigned to an AP, a plurality of frames each including a Beacon element are transmitted in different beam directions after the TXOP period expires;

FIG. 8B is a sequence diagram illustrating an example of a sequence in which after a CF-END frame is transmitted at an end of a TXOP period assigned to an AP, a frame including a Beacon element added with a plurality of trailers is transmitted;

FIG. 8C is a sequence diagram illustrating an example of a sequence in which after a CF-END frame is transmitted at an end of a TXOP period assigned to an AP, a frame including a Beacon element added with a plurality of trailers is transmitted after the TXOP period expires;

FIG. 9 is a sequence diagram for illustrating a specific example of a communication sequence between an AP and STA1 to STA3 according to a second embodiment;

FIG. 10C is a sequence diagram illustrating an example of a sequence in which at an end of a TXOP period assigned to the STA1, in response to receiving a CF-END frame from the STA1, a plurality of CF-END+Beacon frames are transmitted in different beam directions;

FIG. 10D is a sequence diagram illustrating an example of a sequence in which at an end of a TXOP period assigned to STA1, in response to receiving a CF-END frame from the STA1, a CF-END frame is transmitted and then subsequently a plurality of frames each including a Beacon element are transmitted in different beam directions;

FIG. 11C is a sequence diagram illustrating an example of a sequence in which after a TXOP period assigned to STA1 expires, an AP transmits a frame including a Beacon element;

FIG. 11E is a sequence diagram illustrating an example of a sequence in which expiration of a TXOP period is recognized by receiving a CF-END frame from STA1, and an AP transmits a plurality of frames each including a Beacon element in different beam directions after the expiration of the TXOP period;

FIG. 11F is a sequence diagram illustrating an example of a sequence in which after a TXOP period assigned to STA1 expires, an AP transmits a plurality of frames each including a Beacon element in different beam directions;

Figure 13:
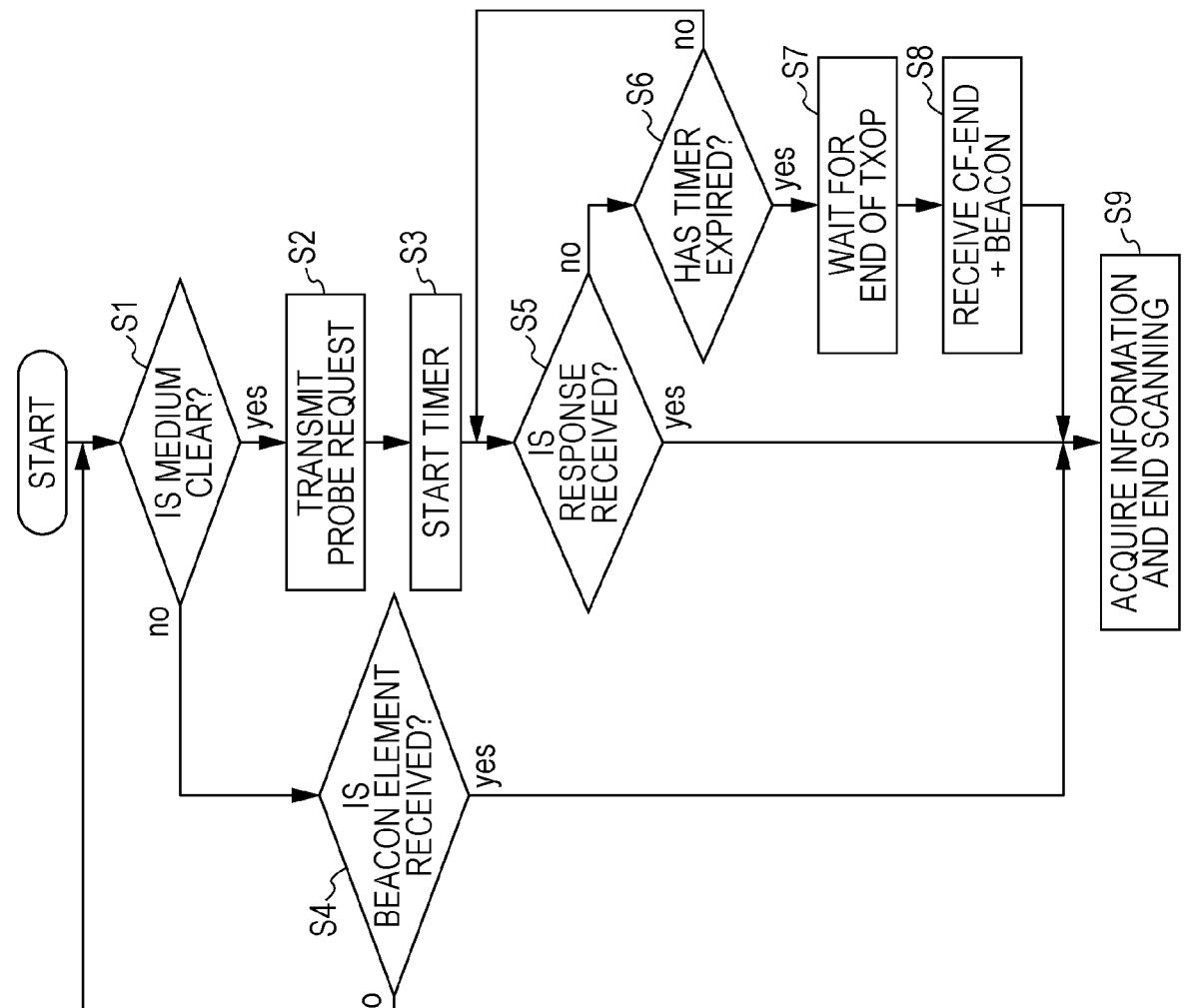
Figure 14:
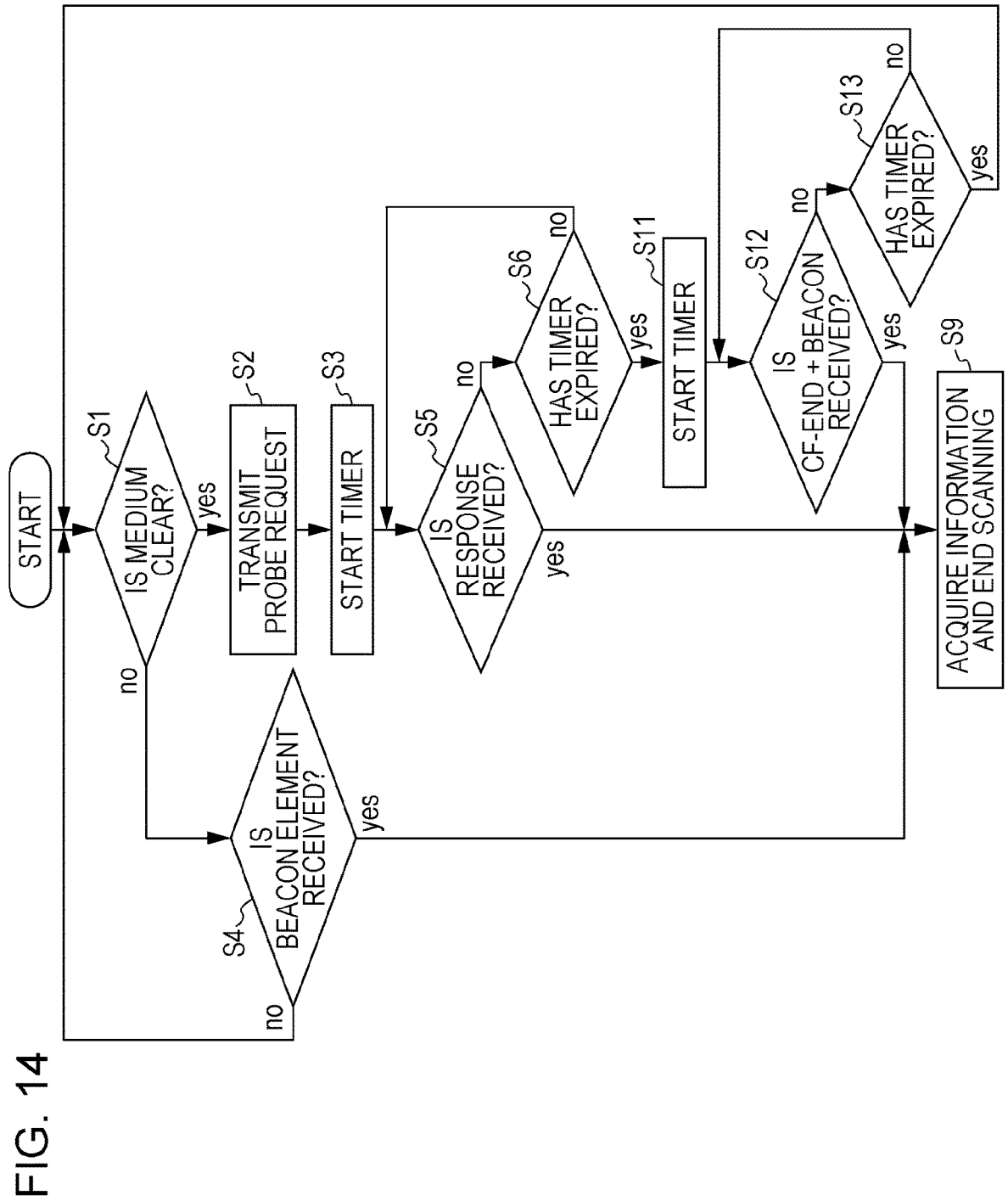

FIG. 13 is a flow chart illustrating an example of an operation of STA2 according to a third embodiment; and FIG. 14 is a flow chart illustrating an example of a modification of an operation of STA2 according to the third embodiment.

DETAILED DESCRIPTION

Description of Basis of the Present Disclosure

In the network configuration according to IEEE802.11, IBSS (Independent Basic Service Set), BSS (Basic Service Set), PBSS (Personal Basic Service Set) and the like are supported as communication modes. IBSS is called an ad hoc mode, and BSS is called an infrastructure mode. In these communication modes, or in BSS or PBSS, an access point AP and PCP (PBSS Control Point) are respectively defined as wireless communication apparatuses corresponding to base station apparatuses that mange connections. Hereinafter, these are referred to collectively as PCP/AP. Furthermore, non-AP STA (STAtion) and non-PCPSTA are defined as wireless communication apparatuses corresponding to wireless terminal apparatuses connected to a base station apparatus. Hereinafter, the wireless communication apparatuses corresponding to the wireless terminal apparatuses are referred to collectively as non-PCP/AP STA.

Note that PBSS and PCP are not defined for non-DMG, and thus in the following description of an operation of non-DMG according to the embodiment, a wireless communication apparatus is denoted, as necessary, as non-(PCP/)AP STA, (PCP/)AP, or the like using parentheses.

A sequence of communication procedure in a wireless LAN system according to IEEE802.11 generally includes scanning, connection authentication, communication (data transfer), and disconnection, which are performed in this order. Depending on a situation, in the middle of communication, scanning may be performed to search for a next connection device, or handover may be performed to switch to a next connection device.

The scanning is an operation of searching for PCP/AP, that is, a wireless communication apparatus to which the connection to be made or searching for PBSS/BSS which is PCP/AP service. The connection authentication is a sequence of operations including an operation of issuing a connection request to a PCP/AP determined as a connection destination of a non-PCP/AP STA, an operation of confirming the connection, and an operation mainly associated with encryption authentication. The communication (data transfer) is an operation of actually transmitting and receiving data. The disconnection is an operation of disconnecting a wireless terminal apparatus from a base station apparatus when it is obvious that communication is no longer necessary. Depending on a situation, the disconnection may be performed not in an explicit manner.

Next, a procedure in the scan operation is described in detail below. In the scan procedure, the following two types of procedures are allowed: Passive Scan; and Active Scan. The Passive Scan is an operation in which non-PCP/AP STA receives a Beacon frame transmitted from PCP/AP, and the non-PCP/AP STA confirms BSSID (Basic Service Set IDentifier). The Active Scan is an operation in which non-PCP/AP STA transmits Probe Request frame which includes a desired SSID or in which a particular PCP/AP is specified thereby requesting a PCP/AP to return a response including BSSID information to the non-PCP/AP STA. These operations include some difference in procedure between non-DMG and DMG as described below.

Passive Scan in Non-DMG (PCP/)AP periodically transmits a Beacon frame to non-(PCP/)AP STA in a receiving state at time TBTT (Target Beacon Transmission Time). The repetition period of TBTT is set to, for example, 100 ms. When non-(PCP/)AP STA receives a Beacon frame, non-(PCP/)AP STA acquires information associated with (PCP/)AP and (PBSS/)BSS from the Beacon frame. Thus, in the Passive Scan in non-DMG, the time needed to complete the scan depends on the repetition period of TBTT.

Active Scan in Non-DMG

According to a wireless medium access procedure, non-(PCP/)AP STA secures a medium and then transmits a Probe Request frame. When (PCP/)AP STA receives the Probe Request frame, (PCP/)AP STA responds, as required, to the non-(PCP/)AP STA by returning a Probe Response frame. The non-(PCP/)AP STA receives the Probe Response frame from the (PCP/)AP STA and acquires information associated with the (PCP/)AP and the (PBSS/)BSS.

The Active Scan can be completed for a short time compared with the Passive Scan. However, situations often occur in which Probe Request frames for the scan are transmitted very frequently. Such situations tend to occur in particular in urban areas in which a huge number of wireless communication apparatuses exit. Such situations may cause interframe interference to occur, which may affect a medium, and thus there is a need for handling such situations.

Passive Scan in DMG

On the other hand, in the passive scan in DMG, the operation is performed as follows. A PCP/AP transmits a Beacon frame to a non-PCP/AP STA in a reception waiting state periodically at time TBTT. When a non-PCP/AP STA receives a Beacon frame, the non-PCP/AP STA acquires information associated with the PCP/AP and the PBSS/BSS. The repetition period of TBTT is set to, for example, 100 ms. Until this step, the operation is similar to that of the Passive Scan in the non-DMG.

Thereafter, the non-PCP/AP STA and the PCP/AP perform beamforming training using a Beacon frame and an SSW (Sector SWeep) frame, and determine beam configurations for the PCP/AP and the non-PCP/AP STA. Note that the beamforming training is an operation performed by DMG device, before connection authentication, to take full advantage of the property of radio waves at frequencies where the radio waves tend to make ling-of-sight propagation. Also in the passive scan in DMG, the time needed to complete the scan depends on the repetition period of TBTT.

Active Scan in DMG

The Active Scan in DMG is described below mainly, by way of example, for a case in which there are two non-PCP/AP STAs. One of the non-PCP/AP STAs randomly transmits a Beacon frame. The other one of the non-PCP/AP STAs also randomly transmits a Beacon frame. When one of the non-PCP/AP STAs receives a Beacon frame, this non-PCP/AP STA acquires information associated with the other one of the non-PCP/AP STAs and information associated with PBSS/BSS to be established.

Furthermore, the two non-PCP/AP STAs perform beamforming training using a Beacon frame and an SSW frame and determine a beam configuration to be used between the two non-PCP/AP STAs. When one of the non-PCP/AP STAs (a first non-PCP/AP STA) receives a Beacon frame, this non-PCP/AP STA transmits Probe Request frame. When this Probe Request frame is received by the other one of the non-PCP/AP STAs (a second non-PCP/AP STA), this second non-PCP/AP STA responds by returning a Probe Response frame. When the Probe Response frame is received by the first non-PCP/AP STA, the first non-PCP/AP STA acquires, from this Probe Response frame, information associated with the second non-PCP/AP STA and information associated with PBSS/BSS which to be established.

The Active Scan in DMG has been described above for the case in which any wireless communication apparatus is not started as a PCP/AP, that is, not as a base station apparatus. In a case where one of the wireless communication apparatuses is already started as a PCP/AP, the transmission repetition period of the Beacon frame is equal to the repetition period of TBTT as in the procedure in non-DMG or as in the procedure in the Passive Scan, and thus the time needed to complete the scan depends on the repetition period of TBTT.

Note that in IEEE802.11, the operation of the Active Scan in non-DMG is allowed to be used in DMG, although it is not used in conventional DMG as described below.

Details of Scan in DMG

Figure 1:
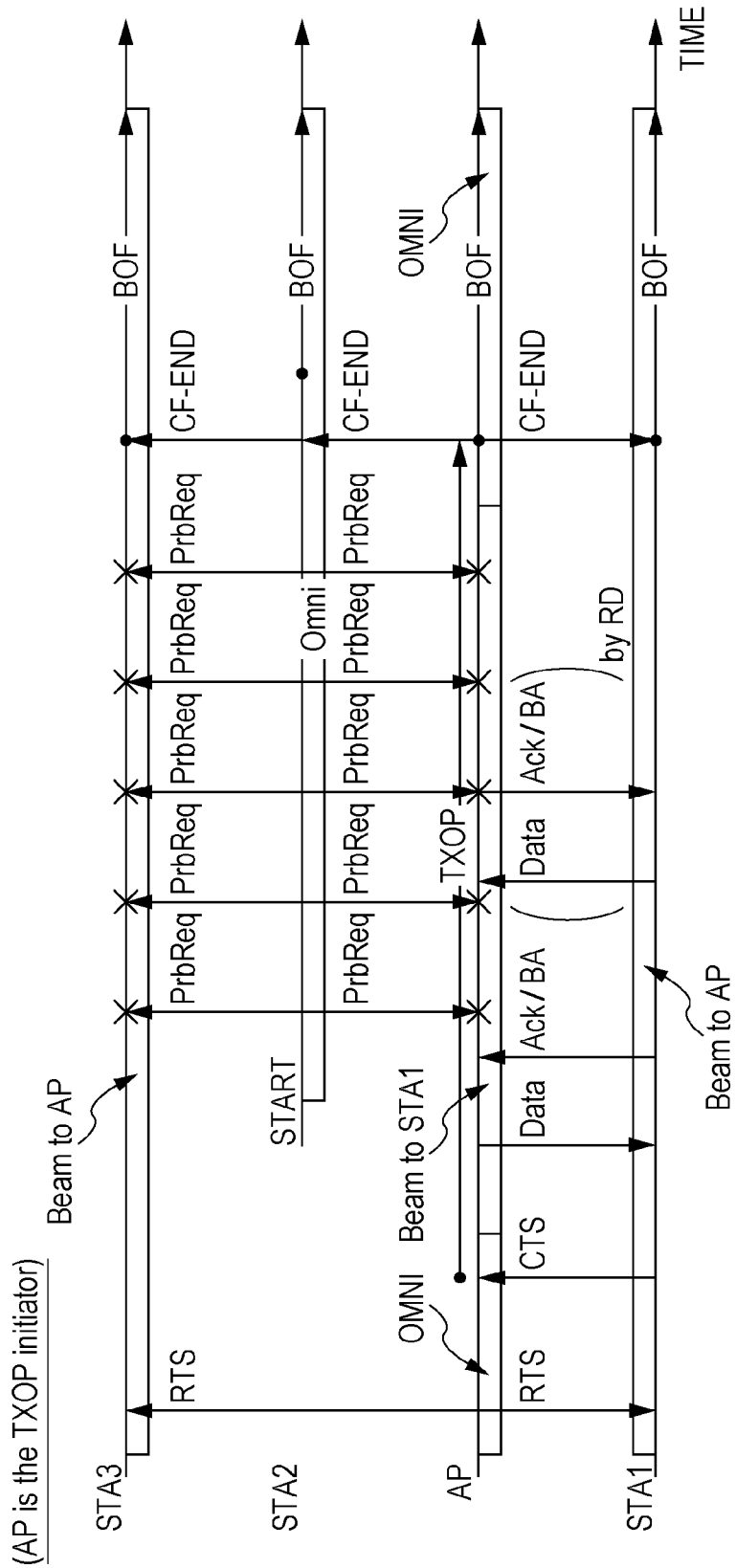
FIG. 1 is a sequence diagram illustrating a sequence for a case where in conventional DMG, a wireless LAN communication is performed between one access point AP and three wireless terminal apparatuses STA1 to STA3.

As examples of operations of non-DMG and DMG, the respective operations of the Passive Scan and the Active Scan have been described above. The scan operation in DMG is described in further detail below. FIG. 1 is a sequence diagram illustrating a sequence for a case where in conventional DMG, a wireless LAN communication is performed between one access point AP and three wireless terminal apparatuses STA1 to STA3.

In FIG. 1, an access point AP is already started, and STA1 and STA3 which are non-PCP/AP STAs are already connected to the AP. In the middle of communication between the AP and the STA1, the STA2 is activated and the STA2 starts scanning. In the sequence diagram illustrated in FIG. 1, the communication between the AP and the STA1 is initiated by the AP.

In a wireless LAN system according to IEEE802.11, medium access control is performed by CSMA/CA (Carrier Sense Multiple Access/Collision Avoidance). Each device of the AP and STA1 to STA3 in FIG. 1 uses, in communication, a radio wave at a frequency at which the radio wave tends to make ling-of-sight propagation or have sharp directivity. Therefore, each device has a capability of changing a beam direction by beamforming.

As illustrated in FIG. 1, in DMG, in a case where the AP is in a state in which the AP is not communicating with any STA, it is difficult for the AP to predict a direction from which a radio wave (beam) will next come from an STA, and thus the AP waits for a radio wave to arrive in a state in which a receiving antenna is set in a Quasi-Omni mode such that it is possible to receive a radio wave coming from any direction.

Note that in a case where communication is performed in a BSS mode, the nature of BSS ensures that the connection destination of the STA is an AP, and thus the STA is allowed to set the beam in a direction toward the AP. That is, in the waiting state, the STA does not need to be in the Quasi-Omni mode. On the other hand, in a case where communication is performed in a PBSS mode, it is difficult for each STA to predict a direction from which a next radio wave (beam) will come, and thus each STA sets the receiving antenna in the Quasi-Omni mode and waits for a radio wave to come as with the case of the AP in the BSS mode.

Although not shown in FIG. 1, first of all, according to CSMA/CA, the AP performs a backoff procedure (arbitration by a coordination function) to avoid a collision between data (frames) which may occur when a plurality of wireless communication apparatuses perform communication substantially simultaneously. After the backoff procedure is ended, to start communication illustrated in FIG. 1, the AP transmits, to the STA1, an RTS (Request to Send) frame whose destination address is set to the STA1. To increase reachability, the RTS frame is transmitted using MCS (Modulation Coding Scheme) for control such as Control-PHY or the like set at a low rate (data communication rate). Note that in the example in FIG. 1, the AP communicates also with the STA3, and thus the AP transmits a RTS frame to the STA3 at the same time as the RTS frame is transmitted to the STA1.

When the STA1 receives a RTS frame addressed to the STA1, the STA1 responds by returning a CTS (Clear to Send) frame. When the AP receives the CTS frame from the STA1, the AP acquires a transmission opportunity TXOP (Transmission OPportunity) over a particular period. In IEEE802.11, it is allowed to set the TXOP period up to 32 ms. For example, the TXOP period is set to a few ms. TXOP is a parameter used by a wireless communication apparatus to set a period during which the wireless communication apparatus occupies a communication channel.

The reception of the CTS frame from the STA1 allows the AP to recognize that the AP has acquired a transmission opportunity over a particular period starting with the reception of the CTS frame, and the AP sets the direction of a transmission/reception beam toward the STA1 such that an improvement in the communication environment is achieved. To make it possible to more surely receive the CTS frame, after the AP transmits the RTS frame, the AP may set the directivity of the reception beam toward the STA1 before the CTS frame is received from the STA1.

The AP continues transmitting frames over the acquired TXOP period. In the TXOP period acquired by the AP, the STA1 transmits and receives data, and transmits an arrival confirmation response by transmitting, as required, an ACK (Acknowledge) frame or BA (Block Ack) frame. Note that in the TXOP period acquired by the AP, the data transmission opportunity may be temporarily transferred from the AP to the STA1 using a RD (Reverse Direction) function or the like, and the STA1 may perform communication.

Even in the middle of the TXOP period, if TXOP is no longer necessary (for example, when there is nothing more to be transmitted), the AP transmits a CF-END frame thereby declaring the release of TXOP and notifying STA1 to STA3 existing around the AP of the release of TXOP.

On the other hand, the STA2 is started in the middle of the TXOP period assigned to the AP, and the STA2 starts to scan a connection destination. To complete the scan in a short time, the STA2 performs a conventional Active Scan procedure, that is, the STA2 transmits a probe request (PrbReq) frame.

However, the AP is in communication with the STA1, and the beams is directed toward the STA1, and thus it is difficult for the AP to receive the PrbReq frame from the STA2 and correctly demodulate the PrbReq frame. Therefore, the AP does not respond.

Because no response is returned from the AP, the STA2 repeatedly retransmits the PrbReq frame as illustrated in FIG. 1. Thus, the transmission of the PrbReq frame from the STA2 can create an interference wave that interferes with the communication between the AP and the STA1, which may impede the communication, or the transmission of the PrbReq frame from the STA2 may interfere with other nearby BSSs, which may impede wireless communication by the nearby BSSs. However, it is difficult for the STA2 to recognize that the wireless communication apparatus of the STA2 is continuously interfering with the communication performed between other wireless communication apparatuses, and thus the STA2 continues generating the interference wave.

As described above, in DMG, use of the conventional Active Scan (used in non-DMG) for quickly completing the scan can result in a difficulty in quickly completing the scan, and can cause interference with a communication wave generated by another wireless communication apparatus, which may cause a reduction in the effective bandwidth of the medium. Therefore, in DMG according to the conventional technique, the conventional Active Scan is not used to quickly complete the scan.

Note that in the case of non-DMG, the directivity of the beam is relatively not strong, and thus even when a radio wave transmitted by the AP is not directed toward the wireless communication apparatus of the STA2, the STA2 is capable of sensing a carrier from the radio wave transmitted by the AP. Therefore, even if retransmitting of the PrbReq frame is performed repeatedly, this does not cause interference.

First Embodiment

Example of Configuration of PCP/AP

Figure 2:
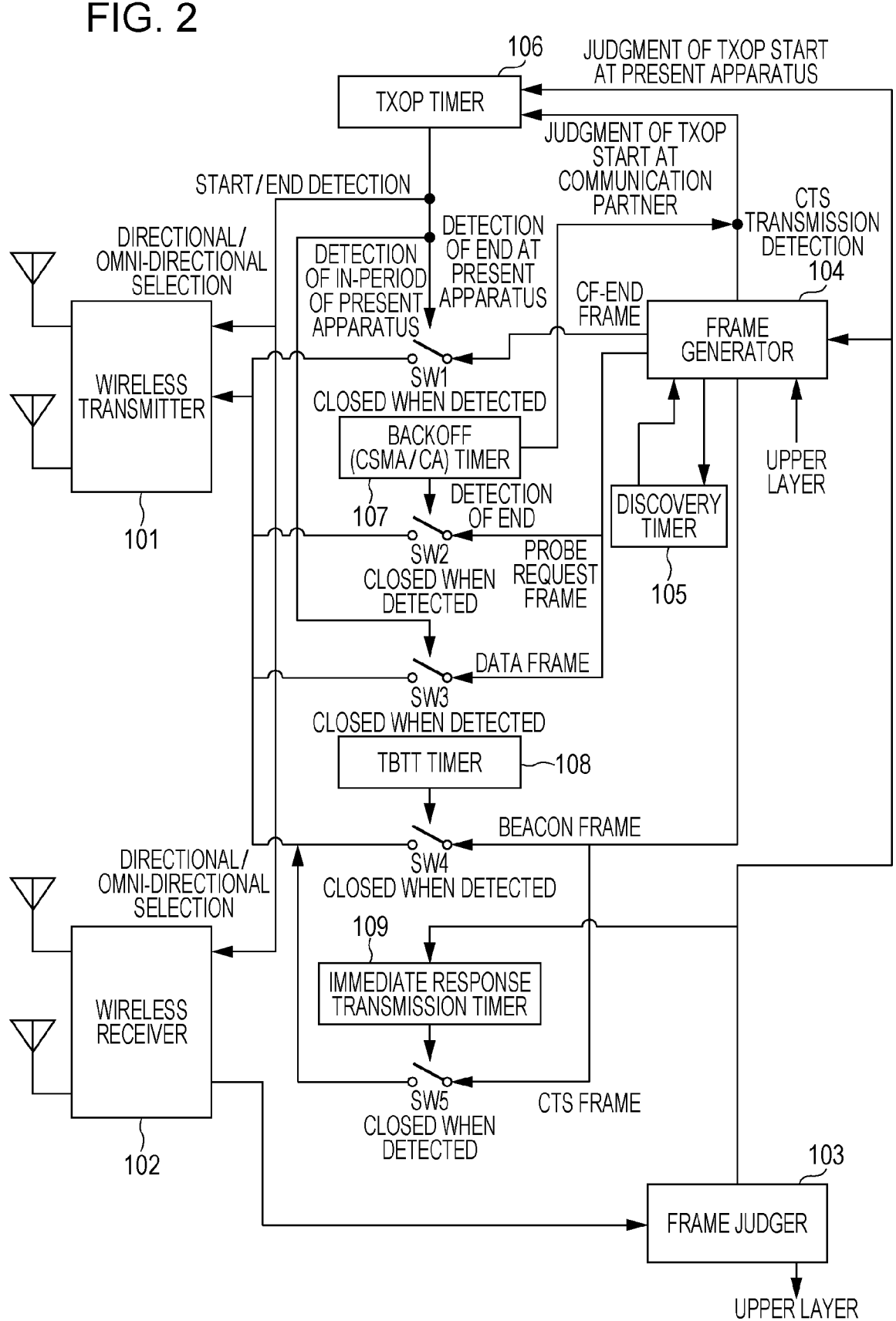
FIG. 2 is a block diagram illustrating an example of a configuration of an access point AP which is an example of PCP/AP.

A first embodiment of the present disclosure applied to a wireless communication system according to IEEE802.11 is described below. In the following description of the embodiment, a DMG wireless communication system is taken as an example. First, a configuration of an access point AP, which is an example of PCP/AP, is described. FIG. 2 is a block diagram illustrating an example of a configuration of an access point AP. Note that the PCP/AP corresponds to a base station apparatus according to the present disclosure. That is, the access point AP illustrated in FIG. 2 is an example of a base station apparatus according to the present disclosure.

FIG. 2 is a block diagram illustrating an example of a configuration of an access point AP. As illustrated in FIG. 2, the AP includes a wireless transmitter 101, a wireless receiver 102, a frame judger 103, a frame generator 104, a discovery timer 105, a TOXP timer 106, a Backoff (CSMA/CA) timer 107, a TBTT timer 108, and an immediate response transmission timer 109.

The wireless transmitter 101 and the wireless receiver 102 each transmits and receives frames to and from, for example, non-PCP/AP STA. The wireless transmitter 101 and the wireless receiver 102 each include at least one antenna and a beam deflection capability and each are capable of changing a beam direction.

When the wireless receiver 102 receives a frame from another non-PCP/AP STA, the frame judger 103 judges the frame type. To judge the frame type, the frame judger 103 refers to a Frame Control field in a MAC header, which is a header of a MAC (Media Access Control) layer, of transmitted data.

Figure 3A:
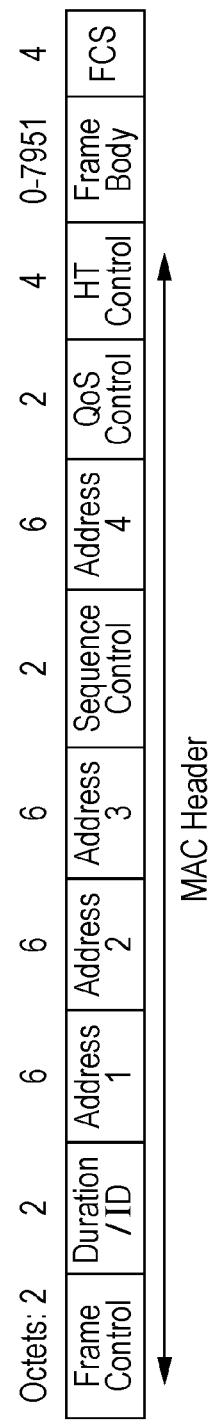
FIG. 3A is a diagram for illustrating a basic frame format used in communication in a wireless LAN system according to IEEE802.11.

FIG. 3A is a diagram for illustrating a basic frame format used in communication in a wireless LAN system according to IEEE802.11. FIG. 3B is a diagram for illustrating a structure of a Frame Control field in a MAC header illustrated in FIG. 3A.

The "Frame Control" field shown in FIG. 3A indicates, as shown in FIG. 3B, the frame type, the decoding method of each address field, whether the current frame is encrypted or not, etc. A "Duration/ID" field shown in FIG. 3A indicates a frame transmission reservation time or a remaining time in the reservation time. An "Address1" field shown in FIG. 3A indicates a destination address, that is, a MAC address or the like of a receiving station.

An "Address2" field shown in FIG. 3A indicates a transmission source address, that is, a MAC address or the like of a wireless transmission apparatus. An "Address3" field shown in FIG. 3A indicates a MAC address (referred to as BSSID or the like) of a base station apparatus of PBSS/BSS. A "Sequence Control" field shown in FIG. 3A indicates a division position, a sequence number, or the like. An "Address4" field shown in FIG. 3A is used when a communication between base station apparatuses (WDS (Wireless Distribution Service)) is performed. A "Frame Body" field shown in FIG. 3A is a body (a content) of data. An "FCS" field shown in FIG. 3A is a field for error checking.

A "Type" field shown in FIG. 3B indicates a main classification of the frame type. A "Subtype" field shown in FIG. 3B indicates a sub classification of the frame type. A "ToDS" field shown in FIG. 3B indicates whether the destination is a base station apparatus or a wireless communication apparatus, or the like. Note that DS stands for Distribution Service. A "FromDS" field shown in FIG. 3B indicates whether the transmission source is a base station apparatus or a wireless communication apparatus, or the like. A "More Fragments" field shown in FIG. 3B indicates whether the current frame is a fragment (divided) frame. A "Retry" field shown in FIG. 3B indicates whether the current frame is a retransmission frame.

A "Power Management" field shown in FIG. 3B indicates whether the transmission source is in a power management mode. A "More data" field shown in FIG. 3B is used to inform an STA being in a power save mode that further data exists. A "Protected Frame" field shown in FIG. 3B indicates whether data is encrypted. An "Order" field shown in FIG. 3B indicates whether a restriction is set on the arrival order.

The frame type is determined by a combination of the "Type" field and the "Subtype" field shown in FIG. 3B. Examples of frame types include a RTS (Request To Send) frame and a CTS (Clear to Send) frame which are used to avoid a collision between wireless communication apparatuses at a start of communication, a Probe Request frame to transmit SSID (Service Set Identifier) to nearby non-PCP/AP STAs and wait for a response to come, a Data frame which is a content of communication, a CF-END (Contention Free-End) frame for announcing an end of communication, etc.

As described above, the frame judger 103 judges the frame type. In a case where the judged frame type is one of the RTS frame, the CTS frame, the Probe Request frame, and the CF-END frame, the frame judger 103 outputs information included in the frame to the frame generator 104 and the TXOP timer 106. In a case where the frame is a Data frame, the frame judger 103 outputs this Data frame to an upper layer (a network layer or higher layer).

The frame generator 104 generates a frame to be transmitted. The type of the frame to be transmitted is a RTS frame, a CTS frame, a Data frame, or a CF-END frame or a Probe Response frame which is a response to a Probe Request frame, a Beacon frame for informing nearby wireless terminal apparatuses of information about the AP, a CF-END+Beacon frame which will be described in detail later, or the like.

In a case where the frame type is judged as the RTS frame by the frame judger 103, the frame generator 104 generates a CTS frame. In a case where the frame type is judged as the Probe Request frame by the frame judger 103, the frame generator 104 generates a Probe Response frame.

In a case where the frame type is judged as a CF-END frame by the frame judger 103, the frame generator 104 judges whether a Beacon element has been transmitted within a particular period by suing, for example, the discovery timer 105 which will be described later. In a case where transmission has not been performed, the frame generator 104 generates a CF-END frame added with a Beacon element (an information element that a non-PCP/AP STA acquires from a Beacon frame when non-PCP/AP STA makes a connection). That is, a CF-END frame transmitted by an AP after a TXOP period expires includes an additionally added Beacon element. Hereinafter, a CF-END frame added with a Beacon element will be referred to as a CF-END+Beacon frame. In a case where communication data is acquired from an upper layer, the frame generator 104 generates a Data frame. Separately from these frames, the frame generator 104 generates a Beacon frame.

In a case where the frame type is judged as a CF-END frame by the frame judger 103, the discovery timer 105 judges whether a Beacon element has been transmitted within a particular period, and the discovery timer 105 outputs a result to the frame generator 104. This allows the frame generator 104 to prevent the frame including the Beacon element from being generated again in the particular period after the CF-END+Beacon frame is generated by the frame generator 104 and transmitted after the expiration of the TXOP period, even when another TXOP period expires. Thus even in a case where the TXOP period is ended before its expiration, for example, when the AP does not have more frames to transmit, it is possible to prevent an excessive number of frames each including a Beacon element from being generated, and thus it is possible to minimize the reduction in the effective bandwidth.

The TXOP timer 106 is a timer that measures elapse of the TXOP period and provides a notification of a start/end of the TXOP period. TXOP is, as described above, a period over which a wireless communication apparatus occupies a communication channel. The TXOP timer 106 makes a judgment, based on a CTS frame acquired from an opposite communication station or based on a CTS frame generated by the frame generator 104, as to whether the TXOP period has been initiation in the wireless communication apparatus or the TXOP period has been initiated in the opposite communication station. In a case where a frame such as a CTS frame or the like is received from an opposite wireless communication apparatus or from a third wireless communication apparatus (not shown), it is recognized that a transmission prohibition period has occurred at the present wireless communication apparatus, and the transmission prohibition period may be counted using the TXOP timer 106. Note that the counting may be performed using a timer other than the TXOP timer.

In a case where a received frame is a CTS frame, the TXOP timer 106 judges that the present wireless communication apparatus is to acquire TXOP. In response, the frame generator 104 generates a CTS frame. When this CTS frame is transmitted, it is judged that the transmission of the CTS frame causes a wireless communication apparatus at an opposite end to acquires TXOP, and the present wireless communication apparatus is to be in a transmission prohibition period.

As described above, when the TXOP period starts at the present wireless communication apparatus or the wireless communication apparatus at the opposite, the TXOP timer 106 performs an end judgment as to whether the TXOP period had ended. In a case where it is judged that the TXOP period has ended, the switch SW1 is closed and the CF-END frame generated by the frame generator 104 is transmitted from the wireless transmitter 101 toward the surroundings.

When it is judged that the TXOP period starts or ends, the wireless transmitter 101 and the wireless receiver 102 switches the beam deflection. More specifically, during the TXOP period, the wireless transmitter 101 and the wireless receiver 102 set the beam such that the beam is directed toward a non-PCP/AP STA at an opposite end, while in a period other than the TXOP period, the beam is set such that the beams is omnidirectional (in an omni mode) or quasi-omnidirectional (in a quasi-omni mode). Furthermore, in a case where it is judged that the period is in the middle of the TXOP period, the switch SW3 is closed and a Data frame is transmitted from the wireless transmitter 101 to the non-PCP/AP STA at the opposite end.

The Backoff (CSMA/CA) timer 107 is a timer that measures a backoff time (a time provided to avoid a collision between frames). Note that CSMA/CA stands for Carrier Sense Multiple Access with Collision Avoidance, and is a communication procedure defined in IEEE802.11. When the Backoff timer 107 judges that the backoff time has ended, the switch SW2 is closed and a RTS frame, a Probe Request frame, a Probe Response frame, a Data frame, or the like generated by the frame generator 104 is transmitted toward the surroundings from the wireless transmitter 101.

The TBTT timer 108 judges whether a transmission repetition period for a Beacon frame has come. In a case where it is judged that the transmission repetition period for the Beacon frame has come, the switch SW4 is closed, and the Beacon frame generated by the frame generator 104 is transmitted toward the surroundings from the wireless transmitter 101.

In a case where an ACK frame is transmitted after a Data frame is received, or in a case where a CTS frame is transmitted after an RTS frame is received, the immediate response transmission timer 109 is started after the Data frame or the RTS frame is received. When the immediate response transmission timer 109 judges that a specified time has expired, the switch SW5 is closed, and an immediate response frame such as an ACK frame, a CTS frame, or the like generated by the frame generator 104 is transmitted from the wireless transmitter 101 to a nearby wireless communication apparatus.

As described above, when the TXOP assigned to the AP has expired, the AP generates a CF-END+Beacon frame by adding Beacon element, which is an information element included in a Beacon frame, to a CF-END frame, and transmits the generated CF-END+Beacon frame. This makes it possible for a non-PCP/AP STA existing around an AP to end the scan operation, without waiting for a Beacon frame, which is not transmitted frequently, to arrive, in response to the Beacon element added to the CF-END frame for notifying nearby wireless communication apparatuses that the AP has come into a communication available state.

Non-PCP/AP STA

Figure 4:
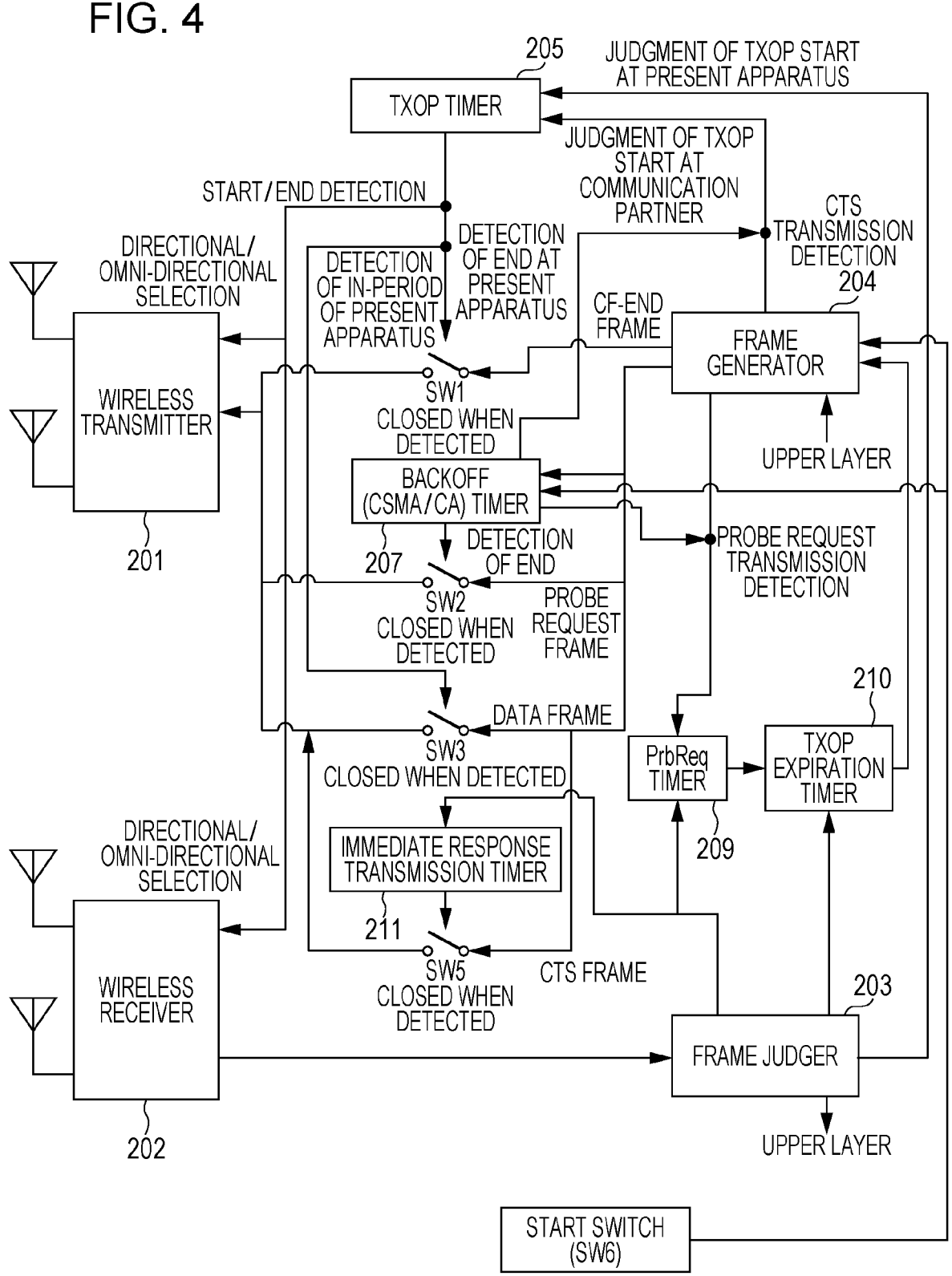
FIG. 4 is a diagram illustrating an example of a configuration of an STA which is an example of a non-PCP/AP STA.

Next, FIG. 4 is a diagram illustrating an example of a configuration of an STA as an example of a non-PCP/AP STA. Note that the non-PCP/AP STA corresponds to the wireless terminal apparatus according to the present disclosure. That is, the STA according to the first embodiment is an example of a wireless terminal apparatus according to the present disclosure. As illustrated in FIG. 4, the STA includes a wireless transmitter 201, a wireless receiver 202, a frame judger 203, a frame generator 204, a TXOP timer 205, a Backoff (CSMA/CA) timer 207, a PrbReq timer 209, a TXOP expiration timer 210, and an immediate response transmission timer 211.

Of the elements shown in FIG. 4, the wireless transmitter 201, the wireless receiver 202, the TXOP timer 205, the Backoff timer 207, and the immediate response transmission timer 211 operate in similar manners to those having the same element names in the AP described above with reference to FIG. 2, and thus a further description thereof is omitted.

The frame judger 203 is similar to the frame judger 103 shown in FIG. 2 in that the frame judger 203 judges types of frames received by the wireless receiver 202 but is different in that further different frame types are judged. More specifically, in addition to the RTS frame, the CTS frame, the CF-END frame, and the Data frame which are also judged by the frame judger 103 of the AP, a judgment is also performed as to the Probe Response frame, the CF-END+Beacon frame transmitted from the AP after the TXOP period expires, and the like.

The frame generator 204 generates a frame to be transmitted to the AP depending on the frame type judged by the frame judger 203. The type of the frame to be transmitted may be the RTS frame, the CTS frame, the Data frame, or the CF-END frame, or may be the Probe Request frame for indicating a request for connection to an AP.

In a case where the frame type judged by the frame judger 203 is the RTS frame, the frame generator 204 generates a CTS frame. In a case where the start switch SW6 is closed and, as a result, an STA is started from a non-active state, the frame generator 204 starts the Backoff (CSMA/CA) timer 207 in response to the starting of the STA. After the Backoff (CSMA/CA) timer 207 expires, the frame generator 204 generates a Probe Request frame and transmits the generated Probe Request frame from the wireless transmitter 201 via the closed switch SW2.

In a case where the frame type is judged as a CF-END frame by the frame judger 203, the frame generator 204 generates a CF-END frame. In a case where communication data is acquired from an upper layer, the frame generator 204 generates a Data frame.

In a case where a Probe Request frame is transmitted, the PrbReq timer 209 counts time. When a Probe Response frame is received within a particular period, it is judged that the scan operation of the STA is completed, and the scan is ended. In a case where no Probe Response frame is received within a first particular period, this fact is notified to the TXOP expiration timer 210.

In a case where the PrbReq timer 209 expires, that is, in a case where no Probe Response frame is received within the first particular period, the TXOP expiration timer 210 starts to count time. In a case where a CF-END+Beacon frame is received within a second particular period, the timer 210 judges that the STA scanning operation is complete and thus the scan is ended. However, in a case where no CF-END+Beacon frame is received within the particular period, the timer 210 outputs, to the frame generator 204, an instruction to generate a Probe Request frame. Before generating the Probe Request frame, the wireless communication apparatus may change a scan frequency (channel) to a next different channel.

With the configuration described above, the PrbReq timer 209 counts the time elapsed since the transmission of the Probe Request frame. After the TXOP expiration timer 210 indicates that the first particular period has elapsed since the transmission of the Probe Request frame, if, within the following second particular period, the CF-END+Beacon frame is not received, the Probe Request frame is generated and retransmitted. By properly adjusting the first particular period and the second particular period, it is possible to prevent the communication band from being compressed by the multiple transmission of the Probe Request frame from the non-PCP/AP STA. Note that the timeout of the TXOP expiration timer 210 indicates that the TXOP period for the AP has expired.

Specific Example of Communication Sequence According to First Embodiment

An example of a configuration of an AP which is an example of a PCP/AP and an example of a configuration of an STA which is an example of a non-PCP/AP STA have been descried above. Next, a specific example of a communication sequence between an AP and a plurality of STAs according to the first embodiment of the present disclosure is described below.

Figure 5:
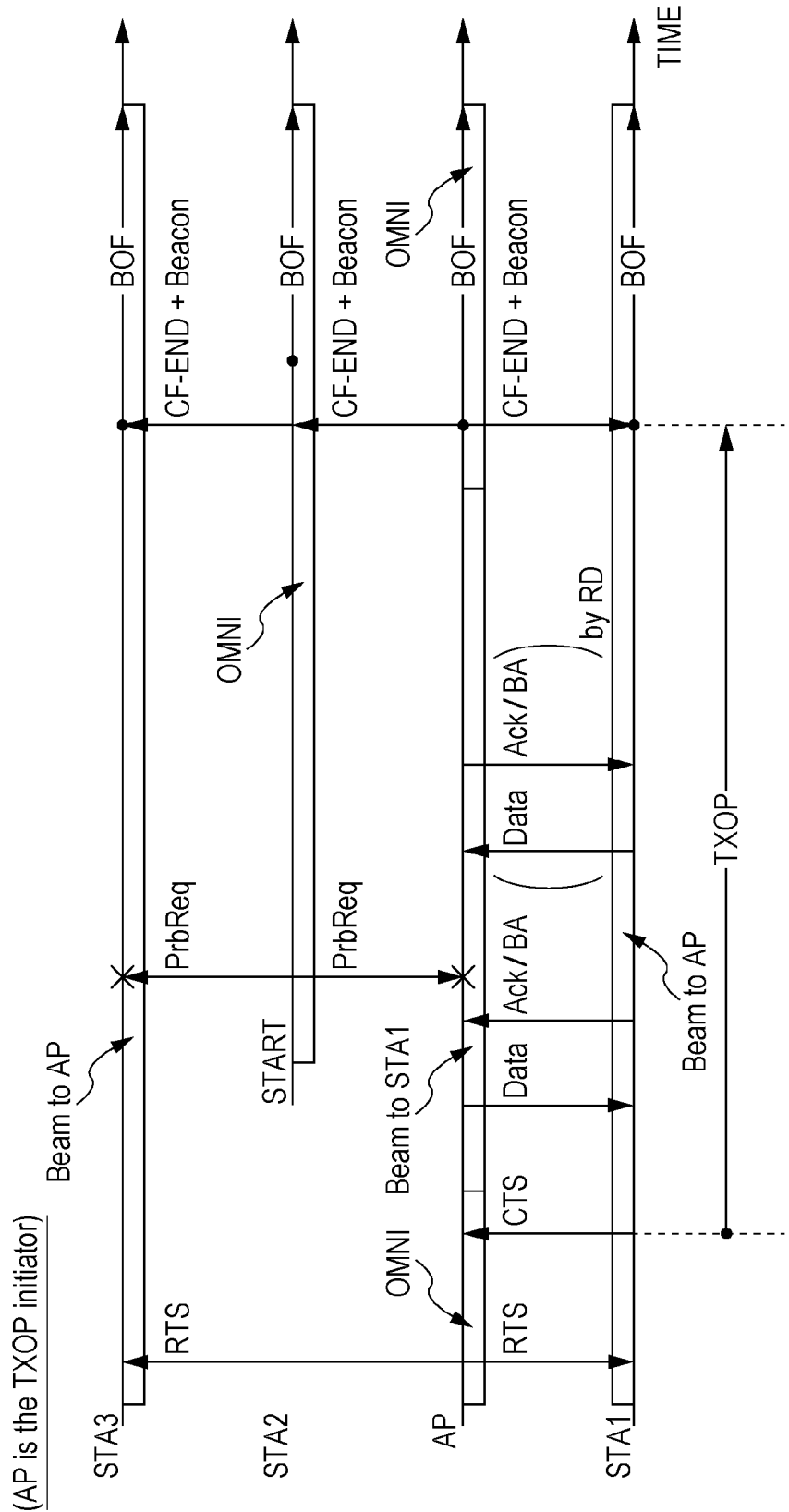
FIG. 5 is a sequence diagram for illustrating a specific example of a communication sequence between an AP and STA1 to STA3 according to a first embodiment.

FIG. 5 is a sequence diagram for illustrating a specific example of a communication sequence between an AP and STA1 to STA3 according to the first embodiment. It is assumed that this communication sequence is performed in DMG. At a start of the communication sequence, the STA1 and the STA 3 are already connected to the AP. In the example shown in FIG. 5, the AP communicates with the STA1. In the middle of the communication between the AP and the STA1, the STA2 is activated, and the STA2 starts scanning. In FIG. 5, the communication between the AP and the STA1 is initiated by the AP.

The AP, first, performs a backoff procedure (arbitration by a coordination function) according to CSMA/CA to avoid a collision between frames due to communication performed substantially simultaneously among a plurality of wireless communication apparatuses. After the backoff procedure is ended, to start communication, the AP transmits, to the STA1, an RTS (Request to Send) frame whose destination address is set to the STA1. To increase reachability, the RTS frame is transmitted using MCS (Modulation Coding Scheme) for control such as Control-PHY or the like set at a low rate (data communication rate).

When the STA1 receives an RTS frame addressed to the STA1, the STA1 responds to the RTS frame addressed to the STA1 by using a CTS (Clear to Send) frame. When the AP receives the CTS frame from the STA1, the AP acquires a transmission opportunity TXOP (Transmission OPportunity) over a particular period.

The receiving of the CTS frame from the STA1 makes the AP recognize that the AP has acquired the transmission opportunity over the particular period since the reception of the CTS frame, and the AP directs a transmission and reception beams toward the STA1 such that better communication is allowed. Note that after the AP transmits the RTS frame, the AP may direct the beam toward the STA1 before the CTS is received such that the reception of the CTS frame becomes surer.

The AP continues transmitting frames over the acquired TXOP period. In the TXOP period acquired by the AP, the STA1 transmits and receives data, and transmits an arrival confirmation response by transmitting, as required, an ACK (Acknowledge) frame or BA (Block Ack) frame. Note that in the TXOP period acquired by the AP, the data transmission opportunity may be temporarily transferred from the AP to the STA1 using a RD (Reverse Direction) function or the like, and the STA1 may perform transmission.

In a case where the TXOP period expires or in a case where the TXOP is no longer necessary although the TXOP period still remains (for example, when there is nothing more to be transmitted), the AP transmits a CF-END frame thereby declaring the release of the TXOP and notifying STA1 to STA3 existing around the AP of the release of TXOP. The CF-END frame transmitted here is a CF-END+Beacon frame added with a Beacon element including information associated with the MAC address or the like of the AP as described above.

On the other hand, in FIG. 5, the STA2 is started in the middle of communication between the AP and the STA1 as in the case of the sequence diagram shown in FIG. 1, and the STA2 transmits a Probe Request frame generated in response to the start. When the Probe Request frame is transmitted, the AP and the STA1 are in the middle of communication with each other, and thus the beam from the AP is directed toward the STA1. Therefore, it is difficult for the AP to receive the PrbReq frame from the STA2 and correctly demodulate the PrbReq frame. Therefore, the AP does not respond.

In the communication sequence in DMG using the conventional technique shown in FIG. 1, the STA2 performs, many times, retransmission of the Probe Request frame. In contrast, in the first embodiment according to the present disclosure shown in FIG. 5, after the STA2 once transmits the Probe Request frame in response to the start, the STA2 does not retransmit the Probe Request frame until a particular time (the first particular time described above+a second particular time) has elapsed even in a case where no response (a Probe Response frame) is received.

In the communication sequence shown in FIG. 5, the STA2 receives a CF-END+Beacon frame from the AP before the particular time elapses. Thus the STA2 does not retransmit the Probe Request frame because the STA2 has already finished the scan operation. However, in a case where a CF-END+Beacon frame is not received by the end of the particular time, the STA2 again generates a Probe Request frame and transmits it toward the AP. The STA2 may change the frequency (channel) to a frequency different from that at which the scan is performed, and the STA2 may transmit the Probe Request frame at the changed frequency.

In the case of the communication sequence shown in FIG. 5, for a wireless terminal apparatus waiting for a Beacon element to arrive from the AP, that is, for a wireless terminal apparatus being in a connection waiting state such as the STA2, receiving of the Beacon element added in the CF-END frame makes it possible to finish the scan operation earlier than the arrival of a Beacon frame which is not transmitted frequently.

Specific Example of CF-END+Beacon Frame

In the first embodiment, as described above, an AP transmits a CF-END+Beacon frame to nearby wireless communication apparatuses in response to expiration of TXOP as illustrated in the communication sequence in FIG. 5.

Preferably, the CF-END+Beacon frame may include BSSID (Basic Service Set Identifier) which is an identifier of a wireless LAN network and may also include SSID (Service Set Identifier) which is an identifier of an AP of PCP/AP. This makes it possible for an STA that wants to make a connection to the AP to finish the scan operation by using the CF-END+Beacon frame, which allows it to increase the operation speed of the scanning.

Figure 6A:
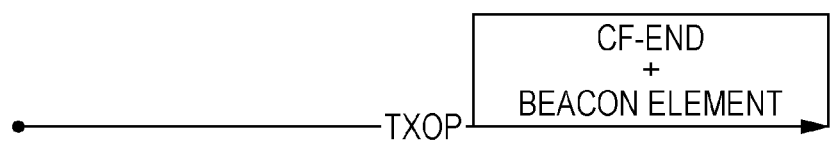
FIG. 6A is a sequence diagram illustrating an example of a sequence in which a CF-END+Beacon frame including a CF-END frame and a Beacon element is transmitted at an end of a TXOP period assigned to an AP.

A specific example of a CF-END+Beacon frame is described below. More specifically, in the example described below, the CF-END+Beacon frame is obtained by putting a CF-END frame and a Beacon element in one frame as illustrated in FIG. 6A. FIG. 6A is a sequence diagram illustrating an example of a sequence in which a CF-END+Beacon frame including a CF-END frame and a Beacon element is transmitted at an end of a TXOP period assigned to an AP. By employing the format shown in FIG. 6A, it becomes sufficient for a wireless communication apparatus (AP) to use one frame instead of using two separate frames, which makes it possible to reduce an overhead such as an interframe gap, and thus it becomes possible to minimize the reduction in effective bandwidth.

Figure 6B:
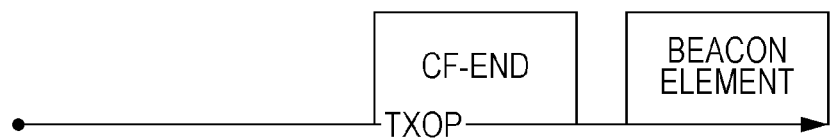
FIG. 6B is a sequence diagram illustrating an example of a sequence in which a CF-END frame and a frame including a Beacon element are sequentially transmitted at an end of a TXOP period assigned to an AP.

However, the present disclosure is not limited to the sequence shown in FIG. 6A. For example, as illustrated in FIG. 6B, a CF-END frame and a frame including a Beacon element may be consecutively transmitted at a trailing end of a TXOP period assigned to an AP. FIG. 6B is a sequence diagram illustrating an example of a sequence in which a CF-END frame and a frame including a Beacon element are sequentially transmitted at an end of a TXOP period assigned to an AP.

Figure 6C:
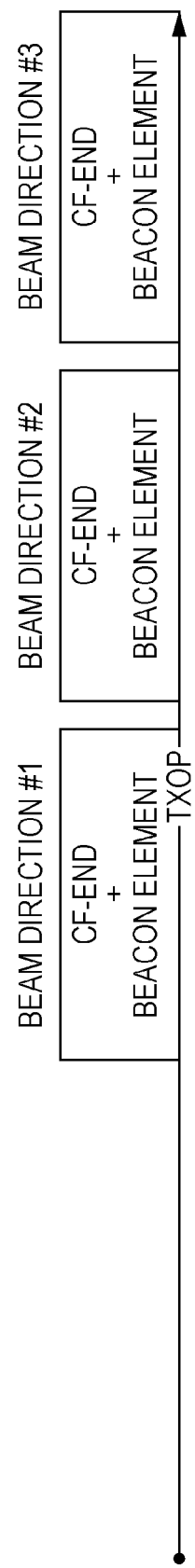
FIG. 6C is a sequence diagram illustrating an example of a sequence in which a plurality of CF-END+Beacon frames are transmitted in different beam directions at an end of a TXOP period assigned to an AP.
Figure 6D:
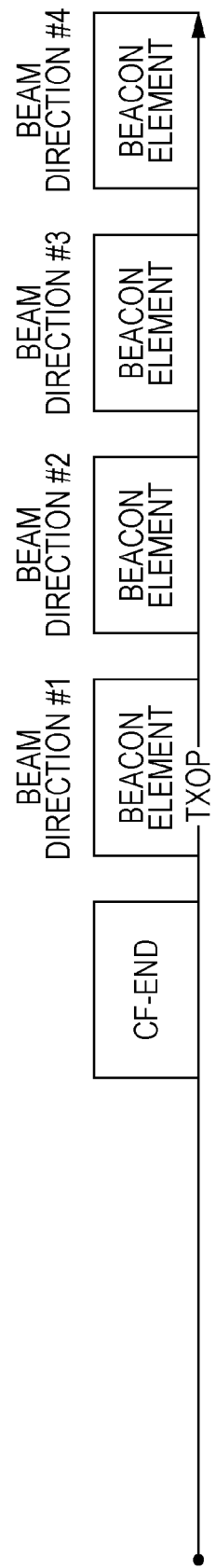
FIG. 6D is a sequence diagram illustrating an example of a sequence in which, following a CF-END frame, a plurality of frames each including a Beacon element are transmitted in different beam directions at an end of a TXOP period assigned to an AP.

In a case where it is desirable to achieve a large (long) reaching distance of a Beacon element to increase the reachability of the Beacon element to a non-PCP/AP STA predicted to be present around an AP, the AP may transmit a plurality of CF-END+Beacon frames in various different beam directions as illustrated in FIG. 6C. FIG. 6C is a sequence diagram illustrating an example of a sequence in which a plurality of CF-END+Beacon frames are transmitted in different beam directions at an end of a TXOP period assigned to an AP. FIG. 6D is a sequence diagram illustrating an example of a sequence in which following a CF-END frame, a plurality of frames each including a Beacon element are transmitted in different beam directions at an end of a TXOP period assigned to an AP.

In a case where an AP transmits a CF-END frame before a TXOP period expires, the AP may transmit the CF-END frame at an end of the TXOP period, and thereafter, the AP may transmit a frame including a Beacon element, that is, the AP may transmit the frame including the Beacon element after the TXOP period expires as illustrated in FIG. 7A. FIG. 7A is a sequence diagram illustrating an example of a sequence in which a CF-END frame is transmitted at an end of a TXOP period assigned to an AP and a frame including a Beacon element is transmitted after the TXOP period expires. By employing this sequence when a TXOP period does not have no more enough time to transmit a Beacon element, it is possible to transmit the Beacon element in a minimum possible period.

Furthermore, in a case where a predetermined TXOP period (for example, 32 milliseconds) expires, the AP does not need to transmit a CF-END frame to provide a notification that the TXOP period has expired. As shown in FIG. 7B, after the TXOP period expires, the AP may transmit a frame including a Beacon element. FIG. 7B is a sequence diagram illustrating an example of a sequence in which a frame including a Beacon element is transmitted after a TXOP period assigned to an AP expires.

Figure 7D:
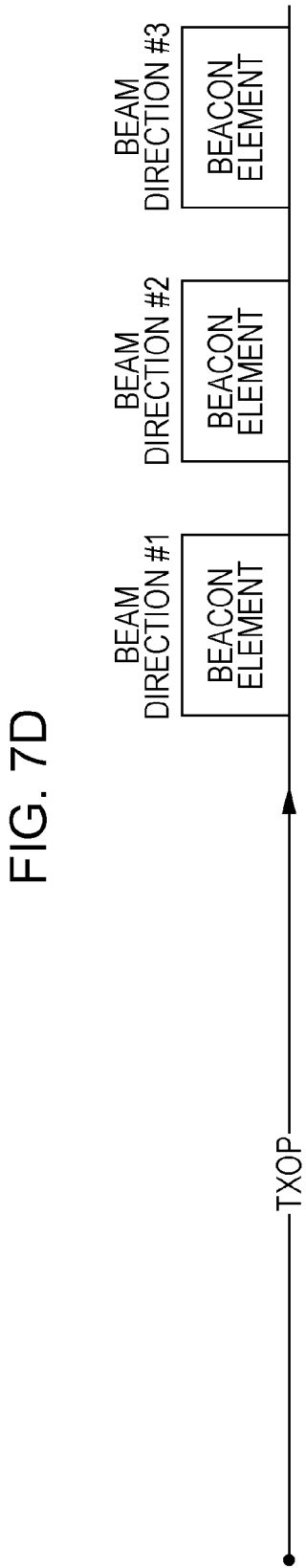
FIG. 7D is a sequence diagram illustrating an example of a sequence in which in a case where a TXOP period assigned to an AP expires, a plurality of frames each including a Beacon element are transmitted in different beam directions.

FIG. 7C is a sequence diagram illustrating an example of a sequence in which after a CF-END frame is transmitted at an end of a TXOP period assigned to an AP, a plurality of frames each including a Beacon element are transmitted in different beam directions after the TXOP period expires. FIG. 7D is a sequence diagram illustrating an example of a sequence in which in a case where TXOP assigned to an AP expires, a plurality of frames each including a Beacon element are transmitted in different beam directions.

FIGS. 8A to 8D illustrate examples of sequences in each of which part of a BRP (Beam Refinement Protocol) packet for beamforming training is added as a trailer to a Beacon element.

The BRP packet is a packet defined in IEEE802.11ad-2012. A trailer added to a Beacon element is part of a BRP packet and is, for example, AGC (Automatic Gain Control) which a field associated with automatic gain control and TRN-R/T which is a field associated with training. Note that -R/T means -R or -T where R means reception (RX) and T means transmission (TX). By adding a plurality of these fields as trailers following a Beacon element, it is possible to make transmission (sweeping) while changing the radio wave direction, and thus it is possible to perform training of beamforming at a time for many directions. Therefore, it is possible to finish, in a shortest possible time, beamforming training between an AP that transmits a Beacon element added with trailers and a non-PCP/AP STA that receives this.

Figure 8A:
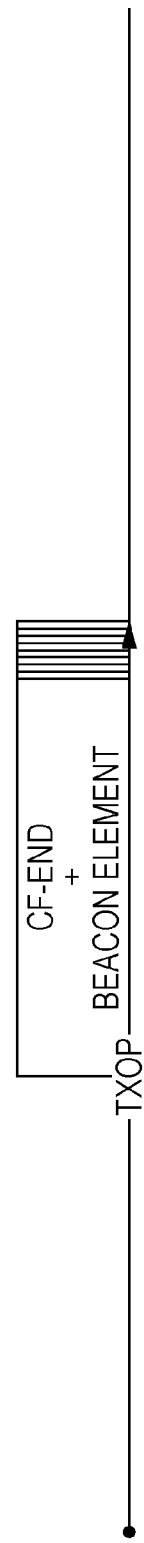
FIG. 8A is a sequence diagram illustrating an example of a sequence in which a CF-END+Beacon frame added with a plurality of trailers is transmitted at an end of a TXOP period assigned to an AP.

FIG. 8A is a sequence diagram illustrating an example of a sequence in which a CF-END+Beacon frame including a plurality of added trailer sis transmitted at an end of a TXOP period assigned to an AP. FIG. 8B is a sequence diagram illustrating an example of a sequence in which after a CF-END frame is transmitted at an end of a TXOP period assigned to an AP, a frame including a Beacon element added with a plurality of trailers is transmitted.

Figure 8D:
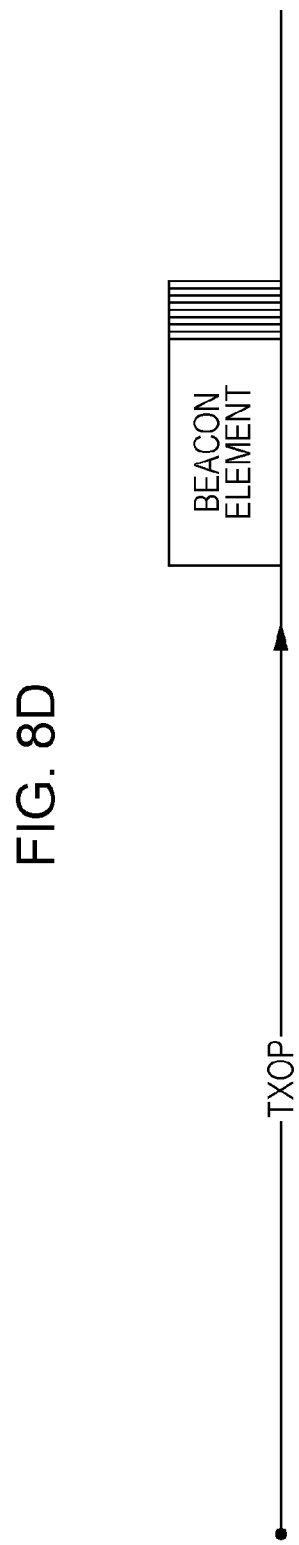
FIG. 8D is a sequence diagram illustrating an example of a sequence in which a frame including a Beacon element added with a plurality of trailers is transmitted after a TXOP period assigned to an AP expires.

FIG. 8C is a sequence diagram illustrating an example of a sequence in which after a CF-END frame is transmitted at an end of a TXOP period assigned to an AP, a frame including a Beacon element added with a plurality of trailer sis transmitted after the TXOP period expires. FIG. 8D is a sequence diagram illustrating an example of a sequence in which a frame including a Beacon element added with a plurality of trailer sis transmitted after a TXOP period assigned to an AP expires.

The wireless communication system according to the first embodiment of the present disclosure has been described above. As described above, this wireless communication system includes a base station apparatus (PCP/AP) that performs a wireless communication with a plurality of wireless terminal apparatuses (non-PCP/AP STA) according to IEEE802.11 such that when a TXOP period for communication with one of the plurality of wireless terminal apparatuses expires, a Beacon element including information associated with the base station apparatus is added to a CF-END frame and the resultant CF-END frame is transmitted to the plurality of wireless terminal apparatuses.

In this wireless communication system configured in the above-described manner, for an STA (for example, the STA2 according to the first embodiment) which is a wireless terminal apparatus waiting for a Beacon element to arrive from an AP which is a base station apparatus, it is possible to finish a scan operation in a relatively short time by receiving a CF-END+Beacon frame transmitted when a TXOP period assigned to the AP expires without waiting for arrival of a Beacon frame that is transmitted from the AP at a low frequency of transmission. This makes it possible for the STA waiting for a Beacon element to arrive from the AP to reduce the number of operations of transmitting the Probe Request frame, a response from the AP to which is not assured. Thus it is possible to avoid a situation in which the effective bandwidth is reduced.

Furthermore, in the first embodiment of the present disclosure, a Beacon information element may be added to a frame (CF_END) for a notification of an end of TXOP (hereinafter, the resultant frame is referred to as a CF_END+Beacon frame), and the resultant CF_END+Beacon frame may be transmitted by an AP. This makes it sufficient to transmit one frame instead of separately transmitting two frames. Thus it becomes possible to reduce an overhead such as an interframe gap or the like, which makes it possible to minimize the reduction in the effective bandwidth.

Second Embodiment

In the first embodiment described above, an AP is an initiator of TXOP, that is, an initiator of communication. A second embodiment described below is similar to the first embodiment in that communication is performed between one AP as PCP/AP and three non-PCP/AP STAs STA1 to STA3, but different in that the STA1 initiates TXOP.

FIG. 9 is a sequence diagram for illustrating a specific example of a communication sequence between an AP and STA1 to STA3 according to a second embodiment. The communication sequence shown in FIG. 9 is a DMG communication sequence. At a point of time when the communication sequence is started in FIG. 9, the STA1 and the STA 3 are already connected to the AP. In the communication sequence shown in FIG. 9, the STA1 communicates with the AP. In the middle of communication, the STA2 is activated and the STA2 starts scanning. In the communication sequence shown in FIG. 9, the communication between the STA1 and the AP is initiated by the STA1.

First of all, according to CSMA/CA, the STA1 performs a backoff procedure (arbitration by a coordination function) to avoid a collision between frames which may occur when a plurality of wireless communication apparatuses perform communication substantially simultaneously. After the backoff procedure is ended, to start communication illustrated in FIG. 9, the STA1 transmits, to the AP, an RTS (Request to Send) frame whose destination address is set to the AP. To increase reachability, the RTS frame is transmitted using MCS (Modulation Coding Scheme) for control such as Control-PHY or the like set at a low rate (data communication rate). The AP waits for a frame to come from an STA existing around the AP while setting the antenna of the wireless receiver in an omnidirectional or quasi-omnidirectional mode until an RTS frame is received from the STA1 and a CTS (Clear To Send) frame is returned.

After the STA1 receives the CTS frame from the AP, the STA1 acquires transmission opportunity TXOP over a particular period. The AP recognizes that the STA1 acquires the transmission opportunity over the particular period after the CTS frame is transmitted to the STA1 from the AP, and the AP sets the direction of a transmission/reception beam toward the STA1 to achieve better communication (to improve the wireless environment).

The STA1 continues the frame transmission over the acquired TXOP period. In the TXOP period acquired by the STA1, the AP transmits and receives data, and transmits a response for arrival confirmation by transmitting, as required, an ACK (Acknowledge) frame or BA (Block Ack) frame. Note that in the TXOP period acquired by the STA1, the data transmission opportunity may be temporarily transferred from the STA1 to the AP using a RD (Reverse Direction) function or the like, and the AP may perform communication.

In a case where the TXOP period expires or in a case where the TXOP is no longer necessary although the TXOP period still remains (for example, when there is nothing more to be transmitted), the STA1 transmits a CF-END frame thereby declaring the release of the TXOP and notifying the AP of this fact. When the AP receives the CF-END frame from the STA1, the AP transmits a CF-END+Beacon frame added with a Beacon element including information as to a MAC address or the like of the AP to provide a notification of the release of the TXOP.

That is, in the case where TXOP is initiated by the STA1, the CF-END frame for declaring the end of the TXOP by the STA1 does not include a Beacon element. Instead, when the AP receives the CF-END frame from the STA1 thereafter, the AP transmits, to the surroundings, the CF-END+Beacon frame added with the Beacon element.

On the other hand, in the sequence diagram shown in FIG. 9, the STA2 is started in the middle of communication between the AP and the STA1 as in the case of the sequence diagram shown in FIG. 1 or FIG. 5, and the STA2 transmits a Probe Request frame generated in response to the start. However, the AP is in communication with the STA1 and the beam is directed toward the STA1, and thus it is difficult for the AP to receive the PrbReq frame from the STA2 and correctly demodulate the PrbReq frame. Therefore, the AP does not respond to the STA2.

In the communication sequence in conventional DMG shown in FIG. 1, the STA2 performs, many times, retransmission of the Probe Request frame. In contrast, in the second embodiment according to the present disclosure shown in FIG. 9, as in the case of the communication sequence shown in FIG. 5, after the STA2 once transmits the Probe Request frame in response to the start, the STA2 does not retransmit the Probe Request frame until a particular time (the first particular time described above+a second particular time) has elapsed even in a case where no response (a Probe Response frame) is received.

In the communication sequence shown in FIG. 9, the STA2 receives a CF-END+Beacon frame from the AP before the particular time elapses. Thus the STA2 does not retransmit the Probe Request frame because the STA2 has already finished the scan operation. However, in a case where a CF-END+Beacon frame is not received by the end of the particular time, the STA2 again generates a Probe Request frame and transmits it toward the AP.

In the case of the communication sequence shown in FIG. 9, for a wireless terminal apparatus waiting for a Beacon element to arrive from the AP, that is, for a wireless terminal apparatus being in a connection waiting state such as the STA2, receiving of the Beacon element added in the CF-END frame makes it possible to finish the scan operation earlier than the arrival of a Beacon frame which is not transmitted frequently.

Specific Example of CF-END+Beacon Frame

In the second embodiment, as described above, an AP transmits a CF-END+Beacon frame to nearby wireless communication apparatuses in response to receiving a CF-END frame from STA1 as illustrated in the communication sequence in FIG. 9.

Preferably, as in the first embodiment, the CF-END+Beacon frame may include BSSID (Basic Service Set Identifier) which is an identifier of a wireless LAN network and may also include SSID (Service Set Identifier) which is an identifier of an AP of PCP/AP. This makes it possible for an STA that wants to make a connection to the AP to finish the scan operation by using the CF-END+Beacon frame, which allows it to increase the operation speed of the scanning.

A specific example of a CF-END+Beacon frame according to the second embodiment is described below. In the second embodiment, in response to receiving the CF-END frame from the STA1, the AP transmits the CF-END+Beacon frame. Thus, in the following description, a specific example is shown as to a CF-END+Beacon frame in the sequence after the CF-END frame is transmitted from the STA1 toward the AP.

Figure 10A:
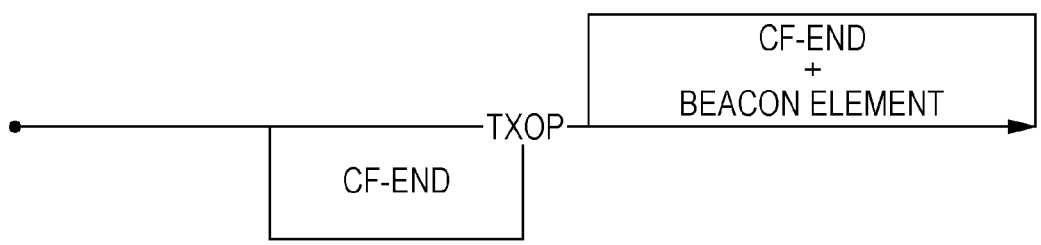
FIG. 10A is a sequence diagram illustrating an example of a sequence in which in response to a CF-END frame from STA1, an AP transmits a CF-END+Beacon frame including a CF-END frame and a Beacon element at an end of a TXOP period.

FIG. 10A is a sequence diagram illustrating an example of a sequence in which in response to a CF-END frame from STA1, an AP transmits a CF-END+Beacon frame including a CF-END frame and a Beacon element at an end of a TXOP period. By employing this scheme, it becomes sufficient for a wireless communication apparatus to transmit a one fame instead of separately transmitting two frames, which makes it possible to reduce an overhead such as an interframe gap, and thus it becomes possible to minimize the reduction in effective bandwidth. In FIG. 10A, the operation of the AP is shown in an area above a line, while the operation of the STA1 is shown in an area below the line. This expression style is also employed in FIGS. 10B, 10C, . . . , FIGS. 12D, 12E, which will be described later.

Figure 10B:
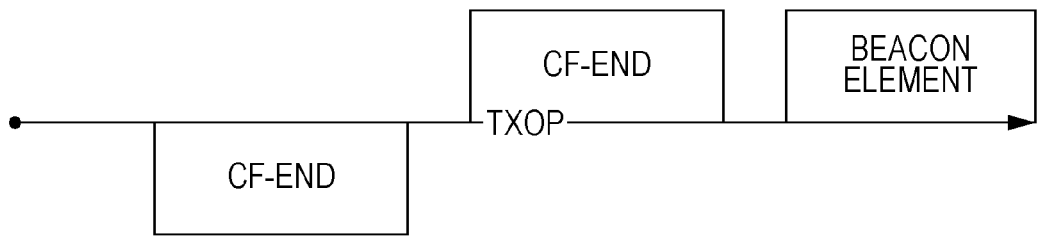
FIG. 10B is a sequence diagram illustrating an example of a sequence in which in response to a CF-END frame from STA1, an AP sequentially transmits a CF-END frame and a frame including a Beacon element at an end of a TXOP period.

Furthermore, for example, as shown in FIG. 10B, in response to a CF-END frame from the STA1, the AP may sequentially transmit a CF-END frame and a frame including a Beacon element at an end of a TXOP period. FIG. 10B is a sequence diagram illustrating an example of a sequence in which in response to a CF-END frame from STA1, an AP sequentially transmits a CF-END frame and a frame including a Beacon element at an end of a TXOP period.

In a case where it is desirable to achieve a large (long) reaching distance of a Beacon element to increase the reachability of the Beacon element to a non-PCP/AP STA predicted to be present around the AP, the AP may transmit a plurality of CF-END+Beacon frames in various different beam directions in response to receiving the CF-END frame from the STA1 as illustrated in FIG. 10C. In FIG. 10C, at an end of a TXOP period assigned to the STA1, in response to receiving a CF-END frame from the STA1, the AP transmits a plurality of CF-END+Beacon frames in different beam directions. In FIG. 10D, at an end of a TXOP period assigned to the STA1, in response to receiving a CF-END frame from the STA1, the AP transmits a CF-END frame and subsequently transmits a plurality of frames each including a Beacon element in different beam directions.

Figure 11A:
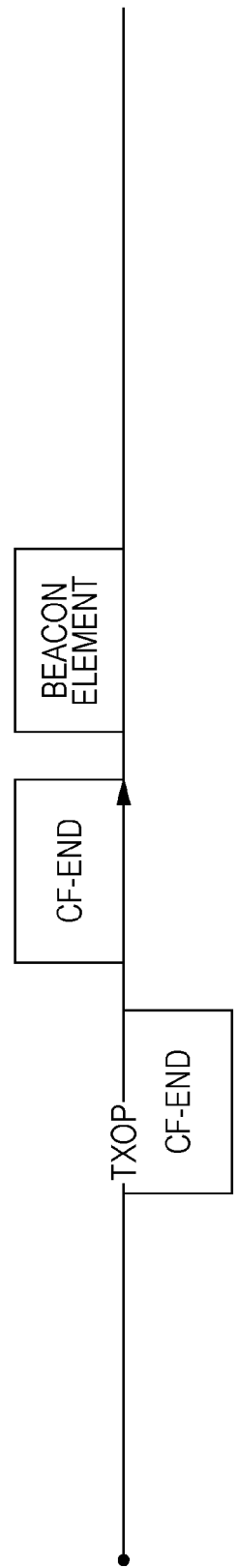
FIG. 11A is a sequence diagram illustrating an example of a sequence in which in response to a CF-END frame transmitted from STA1, an AP transmits a CF-END frame at an end of a TXOP period and further transmits a frame including a Beacon element after the TXOP period expires.

In a case where an AP transmits a CF-END frame before a TXOP period expires, after the AP receives the CF-END frame from STA1, the AP may transmit the CF-END frame at an end of the TXOP period and may transmit a frame including a Beacon element after the TXOP period expires as illustrated in FIG. 11A. FIG. 11A is a sequence diagram illustrating an example of a sequence in which in response to a CF-END frame transmitted from the STA1, the AP transmits a CF-END frame at an end of a TXOP period and further transmits a frame including a Beacon element after the TXOP period expires. By employing this sequence in a situation in which the TXOP period does not have no more enough time to transmit a Beacon element, it is possible to transmit the Beacon element in a minimum possible period.

Figure 11B:
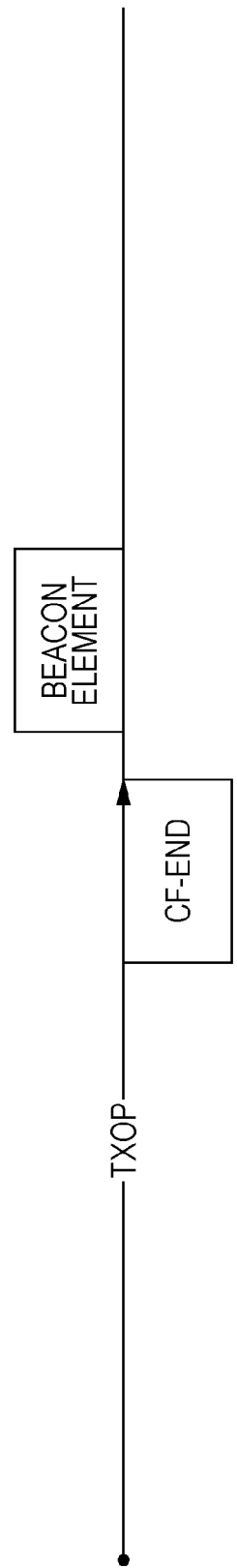
FIG. 11B is a sequence diagram illustrating an example of a sequence in which expiration of a TXOP period is recognized by receiving a CF-END frame from STA1, and an AP transmits a frame including a Beacon element after the expiration of the TXOP period.

Furthermore, in a case where a predetermined TXOP period (for example, 32 milliseconds) expires, the AP does not need to transmit a CF-END frame to provide a notification that the TXOP period has expired. In FIG. 11B, by receiving a CF-END frame from STA1, an AP recognizes that a TXOP period assigned to the STA1 has expired, and the AP transmits a frame including a Beacon element, without transmitting a CF-END frame, after the expiration of the TXOP period.

In FIG. 11C, in a case where a predetermined TXOP period expires, if an AP acquires in advance information as to the TXOP period assigned to STA1, it may be allowed to omit both the transmission of the CF-END frame from the STA1 to the AP and the transmission of the CF-END frame from the AP to the surroundings, and, instead, a frame including a Beacon element may be transmitted after the TXOP period expires.

Figure 11D:
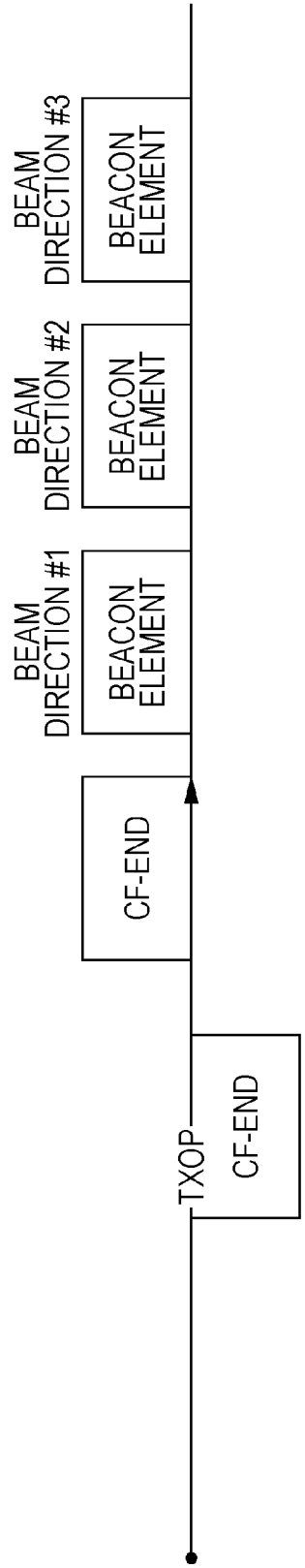
FIG. 11D is a sequence diagram illustrating an example of a sequence in which in response to a CF-END frame transmitted from STA1, an AP transmits a CF-END frame at an end of TXOP and further transmits a plurality of frames each including a Beacon element in different beam directions after the TXOP period expires.

In FIG. 11D, in response to a CF-END frame transmitted from STA1, an AP transmits a CF-END frame at an end of a TXOP period and further transmits a plurality of frames each including a Beacon element in different beam directions after the TXOP period expires.

In FIG. 11E, by receiving a CF-END frame from STA1, an AP recognizes that a TXOP period has expired, and the AP transmits a plurality of frames each including a Beacon element in different beam directions after the expiration of the TXOP period. In FIG. 11F, after a TXOP period assigned to STA1 expires, an AP transmits a plurality of frames each including a Beacon element in different beam directions.

A sequence diagram shown in each of FIGS. 12A to 12E illustrates an example in which part of a BRP (Beam Refinement Protocol) packet for beamforming training is added as a trailer to a Beacon element. The part of the BRP packet added to the Beacon element is similar to that according to the first embodiment described above, and thus a further description thereof is omitted.

Figure 12A:
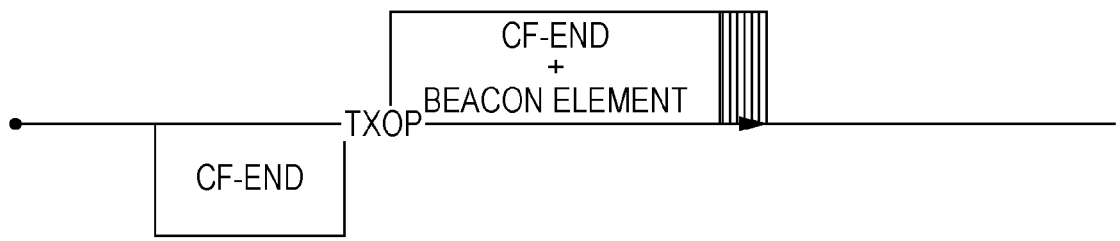
FIG. 12A is a sequence diagram illustrating an example of a sequence in which in response to receiving a CF-END frame from STA1, an AP transmits a CF-END+Beacon frame added with a plurality of trailers.
Figure 12B:
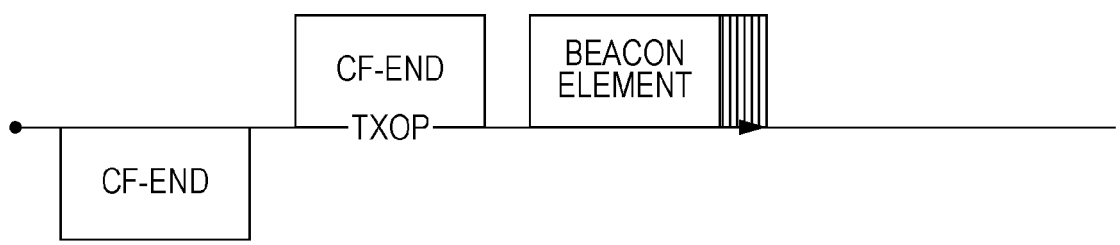
FIG. 12B is a sequence diagram illustrating an example of a sequence in which at an end of a TXOP period assigned to STA1, in response to receiving a CF-END frame from the STA1, an AP transmits a CF-END frame and then a frame including a Beacon element added with a plurality of trailers.

In FIG. 12A, in response to receiving a CF-END frame from STA1, an AP transmits a CF-END+Beacon frame added with a plurality of trailers. In FIG. 12B, at an end of a TXOP period assigned to STA1, in response to receiving a CF-END frame from the STA1, an AP transmits a CF-END frame and then transmits a frame including a Beacon element added with a plurality of trailers.

Figure 12C:
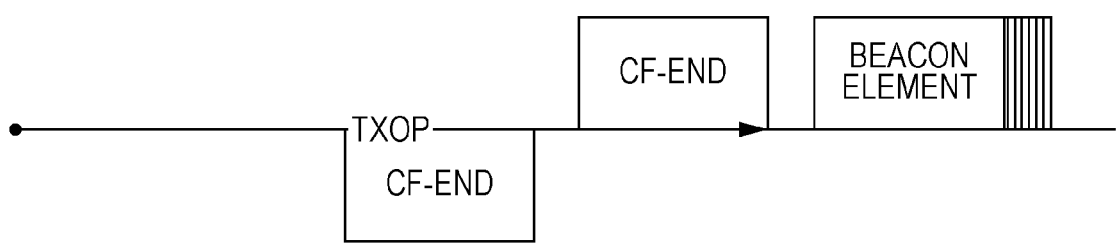
FIG. 12C is a sequence diagram illustrating an example of a sequence in which in response to a CF-END frame transmitted from STA1, an AP transmits a CF-END frame at an end of a TXOP period and further transmits a frame including a Beacon element added with a plurality of trailers after the TXOP period expires.
Figure 12D:
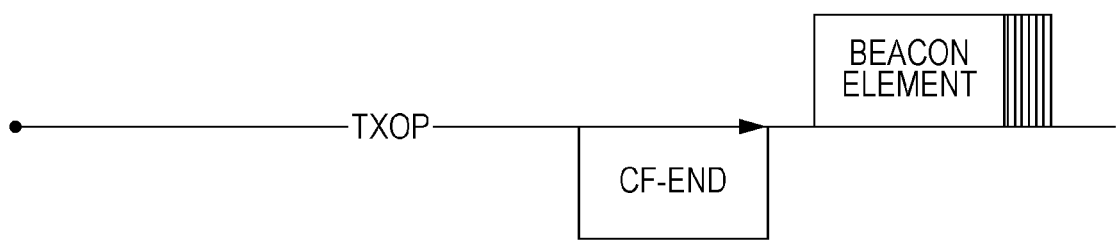
FIG. 12D is a sequence diagram illustrating an example of a sequence in which expiration of a TXOP period is recognized by receiving a CF-END frame from STA1, and an AP transmits a frame including a Beacon element added with a plurality of trailers after the expiration of the TXOP period.
Figure 12E:
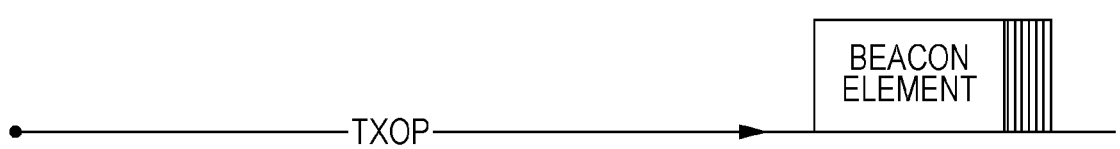
FIG. 12E is a sequence diagram illustrating an example of a sequence in which after a TXOP period assigned to STA1 expires, an AP transmits a frame including a Beacon element added with a plurality of trailers.

In FIG. 12C, in response to a CF-END frame transmitted from STA1, an AP transmits a CF-END frame at an end of a TXOP period and further transmits a frame including a Beacon element added with a plurality of trailers after the TXOP period expires. In FIG. 12D, by receiving a CF-END frame from STA1, an AP recognizes that a TXOP period has expired, and the AP transmits a frame including a Beacon element added with a plurality of trailers after the expiration of the TXOP period. In FIG. 12E, after a TXOP period assigned to STA1 expires, an AP transmits a frame including a Beacon element added with a plurality of trailers.

The wireless communication system according to the second embodiment of the present disclosure has been described above. As described above, the wireless communication system includes the base station apparatus (PCP/AP) that performs a wireless communication with a plurality of wireless terminal apparatuses (non-PCP/AP STAs) according to IEEE802.11 such that when a TXOP period is acquired by one of the plurality of wireless terminal apparatuses, if a CF-END frame is received from this wireless terminal apparatus at an end of the TXOP period, the base station apparatus transmits a CF-END frame added with a Beacon element including information associated with the base station apparatus to the plurality of wireless terminal apparatuses.

In this wireless communication system configured in the above-described manner, also in a case where communication is initiated (TXOP is acquired) by STA1, which is a wireless terminal apparatus, for an STA (for example, the STA2 according to the first embodiment) which is a wireless terminal apparatus waiting for a Beacon element to arrive from an AP, it is possible to finish a scan operation by receiving a CF-END+Beacon frame transmitted when a TXOP period assigned to the AP expires in a relatively shorter time than in the case in which the scan operation waits for arrival of a Beacon frame that is transmitted from the AP at a low frequency of transmission. This makes it possible for the STA waiting for a Beacon element to arrive from the AP to reduce the number of operations of transmitting the Probe Request frame, a response from the AP to which is not assured. Thus it is possible to avoid a situation in which the effective bandwidth is reduced.

Third Embodiment

In the first and second embodiments described above, in a situation in which an AP exists as a PCP/AP and STA1 to STA3 exist as non-PCP/AP STAs, the AP or the STA1 acquires TXOP, and the STA2 is activated in the middle of communication between the STA1 and the AP, and the STA2 starts scanning. To complete the scanning, the STA2 waits for a CF_END+Beacon frame to come from the AP.

In this waiting operation, the STA2 judges whether a medium is clear (silent) at a point of time when the STA2 is started. In a case where a result of the judgment indicates that the medium is clear, there can be following three possible states. A first state is a state in which an AP has no data to be transmitted, and the AP is waiting for a signal to come. A second state is a state in which an AP directs a beam toward an STA to communicate with the STA. A third state is a state in which no AP exists in a transmission area.

In a case where the medium is clear because the AP is the first state, no signal is transmitted from the AP, and thus it is difficult for the STA2 to have an opportunity to acquire Beacon information associated with the AP. To handle such a situation, in the third embodiment, the STA2 transmits a Probe Request frame to the AP once after the STA2 is started.

In the case where the first state is the reason for which the medium is clear, that is, in the case where the AP is in the waiting state, the AP transmits a Probe Response frame to the STA2. This makes it possible for the STA2 to complete the scan operation.

In a case where the second state is the reason for which the medium is clear, that is, in a case where the AP is in communication with another STA or the like, the AP does not respond to the Probe Request frame. Note that the STA2 can recognize that the reason why no response is received is because the AP is in communication with another wireless communication apparatus, and thus the STA2 expects that if the STA2 waits in a waiting state, a CF-END+Beacon frame will be transmitted from the AP when the AP ends the communication with the wireless communication apparatus (when the TXOP period expires).

In a case where the third state is the reason for which the medium is clear, that is, in the case where no AP exists in the transmission area, the Probe Request frame is retransmitted, or an operation similar to that performed when the STA2 is started is performed at a next frequency.

Thus, it is possible to suppress the time needed for the scan to a minimum level, which can minimize the reduction in the effective bandwidth caused by the retransmission of the Probe Request frame by the STA2.

Note that the transmission of the Probe Request frame by the STA2 is performed, as with other frames, after finishing the arbitration by the Coordination function (so-called the Backoff procedure) according to CSMA/CA. There is a possibility that a TXOP period assigned to the AP expires and a Beacon element is received in the middle of the process of monitoring the medium by the Backoff procedure. That is, there is a possibility that a Beacon element is received even in a state in which the medium is not clear.

FIG. 13 a flow chart illustrating an example of an operation of the STA2 according to the third embodiment. Note that although in the third embodiment, the operation of the STA2 which is a wireless terminal apparatus is described, the operation of AP that communicates with the STA2 is similar to the operation described above in the first embodiment or similar to the operation of the AP described above as an example of the operation of the base station apparatus in the second embodiment.

In step S1, the STA 2 judges whether a medium is clear. In a case where it is judged that the medium is clear, the processing flow proceeds to step S2, but otherwise the processing flow proceeds to step S3.

In a case where it is judged in step S1 that the medium is clear, the STA2 transmits, once in step S2, a Probe Request frame. In step S3, the STA2 starts a timer to counts the time elapsed since the transmission of the Probe Request frame.

On the other hand, in a case where it is not judged that the medium is clear, then in step S4, it is judged whether a Beacon element has been received from the AP. In a case where the Beacon element has been received, the processing flow proceeds to step S9, but otherwise the processing flow returns to step S1.

In step S5, the STA2 judges whether a response (a Probe Response frame) has been received from the AP. In a case where the response has been received (first state in which the AP is in the waiting state) the processing flow proceeds to step S9, but otherwise the processing flow proceeds to step S6.

In step S6, the STA 2 judges whether the timer which is started in step S3 has expired. This timer corresponds to the PrbReq timer 209 described above with reference to FIG. 4. The timeout value for the timer, that is, the first particular period may be set, for example, in advance to a sufficient value that allows the Probe Request frame transmitted in step S2 to arrive at the AP and allows the Response frame to be transmitted from the AP and this Response frame to arrive at the STA2. In a case where in step S6 the timer has not yet expired, the processing flow returns to step S5 every predetermined time period shorter than, for example, the first particular period, and the judgment is performed repeatedly as to whether a response from the AP has been received.

On the other hand, in a case where it is judged in step S6 that the timer has expired, that is, in a case where a response to the Probe Request frame transmitted in step S2 is not received within a period until the timer has expired, the processing flow proceeds to step S7. In a case where a response to the Probe Request frame is not received, it is assumed that the reason for no response is because the AP is in "the second state in which the AP is in the middle of communication with another wireless communication apparatus". As a result, in step S7, the STA2 directly goes to a reception waiting state in which the STA2 waits for the TXOP period assigned to the AP to expire.

When the TXOP period assigned to the AP expires, a CF-END+Beacon frame is transmitted from the AP, and thus, in step S8, the STA2 receives this CF-END+Beacon frame.

In a case where a Beacon element is received in step S4, or in a case where a response from the AP is received in step S5, or in a case where a CF-END+Beacon frame is received from the AP in step S8, the STA2 finishes the scan operation.

In a modification of the operation of the STA2 according to the third embodiment shown in FIG. 13, the STA2 may further include a timer that counts time until the TXOP period assigned to the AP expires. FIG. 14 is a flow chart illustrating an example of a modification of an operation of STA2 according to the third embodiment. In FIG. 14, the operation of the STA2 in steps from S1 to S6 and in step S9 is similar as described above, and thus a description thereof is omitted, and steps from S11 to S13, which are different, are described below.

In a case where it is judged in step S6 that a particular time has elapsed since the transmission of the Probe Request frame (the PrbReq timer 209 has expired), then, in step S11, the STA2 restarts a timer. This timer corresponding to the TXOP expiration timer 210 described above with reference to FIG. 4.

In step S12, the STA 2 judges whether a CF-END+Beacon frame has been received from the AP. In a case where the reception has been achieved, the processing flow proceeds to step S9, but otherwise the processing flow proceeds to step S13.

In step S13 a judgment is performed as to whether the timer started in step S11 has expired. The timeout value of the timer, that is, the second particular period, may be set in advance to a predicted period at an end of which the TXOP assigned to the AP will expire. For example, the second particular period may be set to a few ms or a maximum TXOP period, that is, 32 ms. In a case where the timer has expired in step S13 (third state in which no AP exists in the transmission area), the processing flow returns to step S1. In a case where the timer has not yet expired, the processing flow returns to step S12, for example, every particular time shorter than the second particular period to repeatedly perform the judgment as to whether a CF-END+Beacon frame has been received. Note that the STA may perform, at a next frequency, a process similar to that performed after the STA is started.

According to the third embodiment of the present disclosure, as described above, the wireless communication system includes the base station apparatus (PCP/AP) and at least one wireless terminal apparatus that performs wireless communication according to IEEE802.11, wherein the base station apparatus (PCP/AP) operates such that when a TXOP period assigned to communication with one of a plurality of wireless terminal apparatuses (non-PCP/AP STA) expires, a Beacon element including information associated with the base station apparatus is added to a CF-END frame and the resultant CF-END frame is transmitted to the plurality of wireless terminal apparatuses, and wherein the at least one wireless terminal apparatus operates such that the judgment is performed as to whether medium is clear, and if it is judged that the medium is clear, then a Probe Request frame is transmitted to the base station apparatus and the first timer is started, and if a response to the Probe Request frame is not received from the base station apparatus by the time at which the first timer expires, then the at least one wireless terminal apparatus waits until the TXOP period assigned to the base station apparatus expires and a CF-END frame added with a Beacon element including information associated with the base station apparatus is transmitted.

By employing the configuration described above, regardless of whether the medium is clear because an AP, which is an example of the base station apparatus, is in a waiting state or because the AP is in the middle of communication with another STA which is an example of the wireless terminal apparatus, an STA which is waiting for a Beacon element from the AP to come is capable of receiving a frame including a Beacon element from the AP by once transmitting a Probe Request frame. This makes it possible to prevent the effective bandwidth from being reduced by multiple transmission of the Probe Request frame from the STA.

DMG wireless communication systems according to the first to third embodiments have been described above.

However, the present disclosure is not limited to DMG wireless communication systems. Also in a non-DMG wireless communication system, for example, in a case where a beam is directed in a particular direction during a TXOP period as with MIMO (Multi Input Multi Output) or the like, the present disclosure may be applied to achieve effects similar to those achieved in the embodiments described above.

SUMMARY OF THE PRESENT DISCLOSURE

According to an aspect, the present disclosure provides a base station apparatus that performs a wireless communication with a plurality of wireless terminal apparatuses according to IEEE802.11, including a frame generator that generates one or more first frames, each first frame including information indicating that a TXOP period assigned for communication with one of the plurality of wireless terminal apparatuses has expired and an additionally added Beacon element including information associated with the base station apparatus, and a transmitter that transmits the generated one or more first frames to the plurality of wireless terminal apparatuses.

In the base station apparatus in this aspect, the frame generator may generate a second frame by synthesizing the information indicating the expiration of the TXOP period and the Beacon element, and the transmitter may transmit the second frame at an end of the TXOP period.

In the base station apparatus in this aspect, the frame generator may generate a first CF-END frame from information indicating that the TXOP period has expired and may generate a first Beacon element frame from the Beacon element, and the transmitter may transmit the first CF-END frame and subsequently transmits the first Beacon element frame at an end of the TXOP period.

In the base station apparatus in this aspect, the frame generator may generate a plurality of third frames, each being generated by synthesizing the Beacon element and information indicating that the TXOP period corresponding to one of the directions of the plurality of transmission beams has expired, and the transmitter may sequentially transmit the plurality of synthesized third frames at an end of the TXOP period.

In the base station apparatus in this aspect, the frame generator may generate a first CF-END frame from information indicating that the TXOP period has expired, and may generate, from the Beacon element, a plurality of second Beacon element frames corresponding to a plurality of transmission beam directions, and the transmitter may transmit, after the CF-END frame is transmitted, the plurality of second Beacon element frames at an end of the TXOP period.

In the base station apparatus in this aspect, the frame generator may generate a first CF-END frame from information indicating that the TXOP period has expired and may generate a first Beacon element frame from the Beacon element, and the transmitter may transmit the first CF-END frame at an end of the TXOP period and transmits the first Beacon element frame after the TXOP period expires.

In the base station apparatus in this aspect, the frame generator may generate, from the Beacon element, a first Beacon element frame, and the transmitter may transmit, after the expiration of the TXOP period, the first Beacon element frame.

In the base station apparatus in this aspect, the frame generator may generate a first CF-END frame from information indicating that the TXOP period has expired, and may generate, from the Beacon element, a plurality of second Beacon element frames corresponding to a plurality of transmission beam directions, and the transmitter may transmit the first CF-END frame at an end of the TXOP period, and may transmit, after the expiration of the TXOP period, the plurality of second Beacon element frames in sequence.

In the base station apparatus in this aspect, the frame generator may generate, from the Beacon element, a plurality of second Beacon element frame corresponding to a plurality of transmission beam directions, and the transmitter may transmit, after the expiration of the TXOP period, the plurality of second Beacon element frames in sequence.

In the base station apparatus in this aspect, the frame generator may generate a fourth frame by synthesizing information indicating that the TXOP period has expired, the Beacon element, and a plurality of fields used in beamforming training for the plurality of wireless terminal apparatuses, and may transmit the synthesized fourth frame at an end of the TXOP period.

In the base station apparatus in this aspect, the frame generator may generate a first CF-END frame from information indicating that the TXOP period has expired and generates a fifth frame by synthesizing the Beacon element and a plurality of fields used in beamforming training for the plurality of wireless terminal apparatuses, and the transmitter may transmit, after the first CF-END frame is transmitted, the fifth frame at an end of the TXOP period.

In the base station apparatus in this aspect, the frame generator may generate a first CF-END frame from information indicating that the TXOP period has expired and generates a fifth frame by synthesizing the Beacon element and a plurality of fields used in beamforming training for the plurality of wireless terminal apparatuses, and the transmitter may transmit the first CF-END frame at an end of the TXOP period and may transmit the fifth frame after the TXOP period expires.

In the base station apparatus in this aspect, the frame generator may generate a fifth frame by synthesizing the Beacon element and a plurality of fields used in beamforming training for the plurality of wireless terminal apparatuses, and the transmitter may transmit the fifth frame after the TXOP period expires.

The base station apparatus in this aspect may include a receiver that receives a third CF-END frame which is information indicating expiration of the TXOP period from one of the plurality of wireless terminal apparatuses that acquired TXOP, wherein after the third CF-END frame is received, the transmitter may transmit one or more generated first frames to the plurality of wireless terminal apparatuses.

According to an aspect, the present disclosure provides a wireless terminal apparatus that perform wireless communication according to IEEE802.11 with a base station apparatus, including a judger that judges whether a medium is clear, a frame generator that generates a Probe Request frame to be transmitted to the base station apparatus, a transmitter that transmits the Probe Request frame in a case where the judgment indicates that the medium is clear, and a first timer that counts a first predetermined time since the transmission of the Probe Request frame wherein the transmitter waits without transmitting a next frame until one or more first frames is transmitted at an end of a TXOP period assigned to the base station apparatus, each first frame being added with a Beacon element including information associated with the base station apparatus and information indicating that the TXOP period has expired, in a case where a response to the Probe Request frame is not received from the base station apparatus by a time when the first timer finishes the counting of the first predetermined time.

The wireless terminal apparatus in this aspect may include a second timer that counts a second predetermined time in a case where a response to the Probe Request frame is not received from the base station apparatus by a time when the first timer expires, wherein the transmitter may retransmits the Probe Request frame, in a case where one or more first frames are not received from the base station apparatus by a time when the second timer finishes the counting of the second predetermined time.

In the wireless terminal apparatus in this aspect, the transmitter may changes a transmission frequency and retransmits the Probe Request frame to the base station apparatus, in a case where the transmitter hast not received a response to the Probe Request frame from the base station apparatus by a time when the first timer expires.

According to an aspect, the present disclosure provides a wireless communication method in a wireless communication system including a plurality of wireless communication apparatuses and a base station apparatus that performs a wireless communication with the plurality of wireless terminal apparatuses according to IEEE802.11, the wireless communication method including performing processes performed by the base station apparatus, the processes including generating one or more first frames each of which includes information indicating that a TXOP period assigned for communication with one of the plurality of wireless terminal apparatuses has expired and including an additionally added Beacon element including information associated with the base station apparatus, and transmitting the generated one or more first frames to the plurality of wireless terminal apparatuses.

The wireless communication method in this aspect may include performing processes performed by at least one of the wireless terminal apparatuses, the processes including judging whether a medium is clear, in a case where the judgment indicates that the medium is clear, transmitting a Probe Request frame to the base station apparatus, starting a first timer to count a first predetermined time since the transmission of the Probe Request frame, and in a case where a response to the Probe Request frame is not received from the base station apparatus by a time when the first timer finishes the counting of the first predetermined time, waiting without transmitting a next frame until the one or more first frame is transmitted.

The present disclosure is applicable to a base station apparatus, a wireless terminal apparatus, and a wireless communication method, for performing wireless communication according to IEEE802.11.

What is claimed is:

1. A base station apparatus that performs a wireless communication with a plurality of wireless terminal apparatuses according to Institute of Electrical and Electronics Engineers (IEEE) 802.11, comprising:
    frame generation circuitry that generates one or more first Contention Free-End (CF-END) frames, each first CF-END frame including end information indicating that a Transmission OPportunity (TXOP) period assigned for communication with one of the plurality of wireless terminal apparatuses has expired and a Beacon element including identifier information associated with the base station apparatus, each of the one or more first CF-END frames being for use by another one of the plurality of wireless terminal apparatuses to start scan procedure, and
    transmission circuitry that transmits the generated one or more first CF-END frames to the plurality of wireless terminal apparatuses by using a plurality of different transmission beams.

2. The base station apparatus according to claim 1, wherein
    the frame generation circuitry generates a second frame by synthesizing the end information indicating the expiration of the TXOP period and the Beacon element; and
    the transmission circuitry transmits the second frame at an end of the TXOP period.

3. The base station apparatus according to claim 1, wherein
    the frame generation circuitry generates a CF-END frame of the one or more first CF-END frames from the end information indicating that the TXOP period has expired and generates a first Beacon element frame from the Beacon element, and
    the transmission circuitry transmits the first CF-END frame and subsequently transmits the first Beacon element frame at an end of the TXOP period.

4. The base station apparatus according to claim 1, wherein
    the frame generation circuitry generates a plurality of third frames, each being generated by synthesizing the Beacon element and end information indicating that the TXOP period corresponding to one of a plurality of transmission beams has expired; and
    the transmission circuitry sequentially transmits the plurality of synthesized third frames at an end of the TXOP period.

5. The base station apparatus according to claim 1, wherein:
    the frame generation circuitry
        generates a first CF-END frame of the one or more first CF-END frames from the end information indicating that the TXOP period has expired, and
        generates, from the Beacon element, a plurality of second Beacon element frames corresponding to a plurality of transmission beam directions, and
    the transmission circuitry transmits, after the first CF-END frame is transmitted, the plurality of second Beacon element frames at an end of the TXOP period.

6. The base station apparatus according to claim 1, wherein
    the frame generation circuitry generates a first CF-END frame of the one or more first CF-END frames from the end information indicating that the TXOP period has expired and generates a first Beacon element frame from the Beacon element, and
    the transmission circuitry transmits the first CF-END frame at an end of the TXOP period and transmits the first Beacon element frame after the TXOP period expires.

7. The base station apparatus according to claim 1, wherein
    the frame generation circuitry generates, from the Beacon element, a first Beacon element frame, and
    the transmission circuitry transmits, after the expiration of the TXOP period, the first Beacon element frame.

8. The base station apparatus according to claim 1, wherein
    the frame generation circuitry
        generates a first CF-END frame of the one or more first CF-END frames from the end information indicating that the TXOP period has expired, and generates, from the Beacon element, a plurality of second Beacon element frames corresponding to a plurality of transmission beam directions, and the transmission circuitry
transmits the first CF-END frame at an end of the TXOP period, and
transmits, after the expiration of the TXOP period, the plurality of second Beacon element frames in sequence.

9. The base station apparatus according to claim 1, wherein
the frame generation circuitry generates, from the Beacon element, a plurality of second Beacon element frame corresponding to a plurality of transmission beam directions, and
the transmission circuitry transmits, after the expiration of the TXOP period, the plurality of second Beacon element frames in sequence.

10. The base station apparatus according to claim 1, wherein the frame generation circuitry
generates a fourth frame by synthesizing information indicating that the TXOP period has expired, the Beacon element, and a plurality of fields used in beamforming training for the plurality of wireless terminal apparatuses, and
transmits the synthesized fourth frame at an end of the TXOP period.

11. The base station apparatus according to claim 1, wherein
the frame generation circuitry generates a first CF-END frame of the one or more first CF-END frames from the end information indicating that the TXOP period has expired and generates a fifth frame by synthesizing the Beacon element and a plurality of fields used in beamforming training for the plurality of wireless terminal apparatuses, and
the transmission circuitry transmits, after the first CF-END frame is transmitted, the fifth frame at an end of the TXOP period.

12. The base station apparatus according to claim 1, wherein
the frame generation circuitry generates a first CF-END frame of the one or more first CF-END frames from the end information indicating that the TXOP period has expired and generates a fifth frame by synthesizing the Beacon element and a plurality of fields used in beamforming training for the plurality of wireless terminal apparatuses, and
the transmission circuitry transmits the first CF-END frame at an end of the TXOP period and transmits the fifth frame after the TXOP period expires.

13. The base station apparatus according to claim 1, wherein
the frame generation circuitry generates a fifth frame by synthesizing the Beacon element and a plurality of fields used in beamforming training for the plurality of wireless terminal apparatuses, and
the transmission circuitry transmits the fifth frame after the TXOP period expires.

14. The base station apparatus according to claim 1, comprising a receiver that receives a third Contention Free-End (CF-END) frame which is information indicating expiration of the TXOP period from one of the plurality of wireless terminal apparatuses that acquired TXOP,
wherein after the third CF-END frame is received, the transmission circuitry transmits one or more generated first frames to the plurality of wireless terminal apparatuses.

15. A wireless terminal apparatus that performs wireless communication according to Institute of Electrical and Electronics Engineers (IEEE) 802.11 with a base station apparatus, comprising:
a judgement circuitry that judges whether a medium is clear;
a frame generation circuitry that generates a Probe Request frame to be transmitted to the base station apparatus;
a transmission circuitry that transmits the Probe Request frame in a case where the judgment indicates that the medium is clear; and
a first timer circuitry that counts a first predetermined time since the transmission of the Probe Request frame,
wherein the transmission circuitry, in a case where a response to the Probe Request frame is not received from the base station apparatus by a time when the first timer finishes the counting of the first predetermined time, waits without transmitting a next frame until one or more first Contention Free-End (CF-END) frames are transmitted at an end of a Transmission OPportunity (TXOP) period assigned to the base station apparatus, each first CF-END frame including a Beacon element including identifier information associated with the base station apparatus and end information indicating that the TXOP period has expired, each first CF-END frame being for use by another one of a plurality of wireless terminal apparatuses to start scan procedure, the one or more first CF-END frames being transmitted to the plurality of wireless terminal apparatuses by using a plurality of different transmission beams.

16. The wireless terminal apparatus according to claim 15, comprising a second timer that counts a second predetermined time in a case where a response to the Probe Request frame is not received from the base station apparatus by a time when the first timer expires,
wherein the transmission circuitry retransmits the Probe Request frame, in a case where the one or more first CF-END frames are not received from the base station apparatus by a time when the second timer finishes the counting of the second predetermined time.

17. The wireless terminal apparatus according to claim 15, wherein the transmission circuitry changes a transmission frequency and retransmits the Probe Request frame to the base station apparatus, in a case where the transmission circuitry hast not received a response to the Probe Request frame from the base station apparatus by a time when the first timer expires.

18. A wireless communication method in a wireless communication system including a plurality of wireless communication apparatuses and a base station apparatus that performs a wireless communication with the plurality of wireless terminal apparatuses according to Institute of Electrical and Electronics Engineers (IEEE802.11), the wireless communication method comprising performing processes performed by the base station apparatus, the processes comprising:
generating one or more first Contention Free-End (CF-END) frames, each first CF-END frame including end information indicating that a Transmission OPportunity (TXOP) period assigned for communication with one of the plurality of wireless terminal apparatuses has expired and including a Beacon element including identifier information associated with the base station apparatus, each of the one or more first CF-END frames being for use by another one of the plurality of wireless terminal apparatuses to start scan procedure; and transmitting the generated one or more first CF-END frames to the plurality of wireless terminal apparatuses by using a plurality of different transmission beams.

19. The wireless communication method according to claim 18, comprising performing processes performed by at least one of the plurality of wireless terminal apparatuses, the processes comprising:

judging whether a medium is clear;

in a case where the judgment indicates that the medium is clear, transmitting a Probe Request frame to the base station apparatus;

starting a first timer to count a first predetermined time since the transmission of the Probe Request frame; and in a case where a response to the Probe Request frame is not received from the base station apparatus by a time when the first timer finishes the counting of the first predetermined time, waiting without transmitting a next frame until the one or more first CF-END frames is transmitted.

\* \* \* \* \*